United States Patent [19]

Sano et al.

[11] Patent Number: 5,060,975
[45] Date of Patent: Oct. 29, 1991

[54] PART-MOUNTING STRUCTURE FOR VEHICLE BODY

[75] Inventors: Shoichi Sano, Tokyo; Suguru Yoshida; Ken Uchida, both of Asaka; Hajime Kajiwara, Fujimi; Masao Ohno, Urawa; Tateo Kawade, Toda, all of Japan

[73] Assignee: Honda Giken Kogyo Kabushiki Kaisha, Tokyo, Japan

[21] Appl. No.: 446,429

[22] Filed: Dec. 5, 1989

[30] Foreign Application Priority Data

| Dec. 9, 1988 | [JP] | Japan | 63-160158[U] |
| Dec. 29, 1988 | [JP] | Japan | 63-170370[U] |
| Jan. 18, 1989 | [JP] | Japan | 1-3945[U] |
| Jan. 23, 1989 | [JP] | Japan | 1-6253[U] |
| Mar. 16, 1989 | [JP] | Japan | 1-30107[U] |
| Mar. 16, 1989 | [JP] | Japan | 1-30108[U] |
| Mar. 20, 1989 | [JP] | Japan | 1-31838[U] |
| Apr. 25, 1989 | [JP] | Japan | 1-48680[U] |
| Jun. 20, 1989 | [JP] | Japan | 1-72062[U] |

[51] Int. Cl.⁵ .......................................... B60G 21/00
[52] U.S. Cl. .................................. 280/787; 280/784; 280/785
[58] Field of Search ............... 280/781, 784, 785, 793, 280/797, 798

[56] References Cited

U.S. PATENT DOCUMENTS

| 3,888,502 | 6/1975 | Felzer et al. | 280/784 |
| 4,231,589 | 11/1980 | Hodgkins et al. | 280/781 |
| 4,643,448 | 2/1987 | Loren | 280/784 |

FOREIGN PATENT DOCUMENTS

| 1136589 | 9/1962 | Fed. Rep. of Germany . |
| 3035644 | 5/1982 | Fed. Rep. of Germany . |
| 2107001 | 4/1972 | France . |
| 2520319 | 1/1983 | France . |
| 4636329 | 3/1966 | Japan . |
| 4732521 | 11/1972 | Japan . |
| 5543912 | 1/1973 | Japan . |
| 7114774 | 7/1982 | Japan . |
| 2166136 | 10/1987 | Japan . |
| 2174935 | 11/1987 | Japan . |
| 2174978 | 11/1987 | Japan . |
| 62174979 | 11/1987 | Japan . |
| 63-30276 | 2/1988 | Japan . |
| 1147761 | 4/1969 | United Kingdom . |

OTHER PUBLICATIONS

Product Engineering, vol. 44, No. 4, Apr. 1973, New York U.S., pp. 29–31; "Weight-Saving Foam Plastic Sandwiches Form Auto Chassis".

Primary Examiner—Kenneth R. Rice

[57] ABSTRACT

The part-mounting structure of the present invention includes a part-mounting portion of a sandwich structure constituted by a core layer and plastic skin layers formed on both surfaces of the core layer, and a part-mounting metal member, at least one of the skin layers having a tapered recess having a sloped side wall and a flat bottom wall, the bottom wall being constituted by the skin layers bonded together, the part-mounting metal member having a bottom plate, and a pair of side plates vertically extending from the bottom plate substantially on both sides, at least one of the side plates having a dent tapered complementarily to the tapered recess of the sandwich structure. The part-mounting metal member is mounted to the part-mounting portion of the sandwich structure with a surface of the tapered recess of the sandwich structure and a surface of the tapered dent of the part-mounting metal member bonded together by an adhesive. This structure is suitable for mounting various parts such as engines, suspension beams, upper arms, radius rods, dampers, seat slide rails, etc. to the vehicle body.

29 Claims, 28 Drawing Sheets (a)

(b)

PART-MOUNTING STRUCTURE FOR VEHICLE BODY

BACKGROUND OF THE INVENTION

1. Field of the Invention

The present invention relates to a part-mounting structure for a sandwich structure constituted by a core layer and skin layers, and more particularly to a part-mounting structure for a vehicle body constituted by such a sandwich structure.

2. Description of Related Art

Recently, to reduce vehicles' weights and to increase productivity by reducing vehicles' parts, it was proposed to use composite structures such as fiber-reinforced plastics for vehicle bodies, and they are now partly put into practical use.

Such composite structures are in general sandwich structures constituted by cores coated with skin layers on both surfaces. Various proposals were made to use foamed plastics for cores (Japanese Patent Publication Nos. 46-36329 and 55-43912, Japanese Utility Model Laid-Open No. 63-30276, U.S. Pat. Nos. 4,559,274 and 4,573,707, etc.), and to use honeycomb structures for cores (Japanese Patent Laid-Open No. 47,32521, Japanese Utility Model LaidOpen Nos. 57-114774, 62-174935 and 62-174978, etc.). It was also proposed to use for vehicle bodies sandwich structures whose core portions are partly hollow (Japanese Utility Model Laid-Open No. 62-166136, etc.).

However, in such sandwich structures, if parts such as engines, suspension beams, upper arms, radius rods, dampers, seat slide rails, etc. are mounted to them directly by screws, etc., the screws would not be able to be firmly fixed, and the mounting strength of parts would be insufficient. Particularly, since various parts such as engines mounted to the vehicle body are heavy and subjected to vibrations, mere threading, welding or bonding for mounting the parts onto the skin layers of the sandwich structures would result in an insufficient mounting strength. In addition, once peeling takes place in the adhesion layer, the breakage thereof would propagate quickly.

Also, since a floor panel, a lower part of the vehicle body, is provided with various parts such as seats, a side brake, a change lever, etc., and is subjected to a large stress, it should have part-mounting structures having extremely high strength.

Further, if part-mounting brackets are used to mount parts to the vehicle body, the reduction of the number of parts and vehicles' weights would not be achieved. In addition, since the brackets are generally bulky, the mounting space would be inevitably large.

In addition, since the seat slide rails are portions to which the overall weight of a passenger is applied, and are likely to be subjected to a large load upon sliding the seat, slide rail-mounting structure is required to have high strength.

OBJECT AND SUMMARY OF THE INVENTION

Accordingly, an objects of the present invention is to provide a structure for mounting various parts such as engines suspension beams, upper arms, radius rods, dampers, seat slide rails, etc. to a vehicle body of a sandwich structure constituted by a core layer and skin layers with sufficient strength.

Specifically, an object of the present invention is to provide a part-mounting portion of a vehicle body of a sandwich structure to which a part is fixedly mounted.

Another object of the present invention is to provide a part-mounting metal member for mounting a part to a sandwich structure with sufficient strength.

A further object of the present invention is to provide a part-mounting structure comprising a part-mounting portion of a sandwich structure and a part-mounting metal member.

As a result of intense research in view of the above objects, the inventors have found that by providing a sandwich structure with a tapered recess in its part-mounting portion, and by fixedly mounting a part-mounting metal member having a complementary tapered dent to the tapered recess of the sandwich structure by an adhesive, a load exerted from a part such as a front suspension beam, an upper arm, an engine, a radius rod, a damper, a seat slide rail, etc. mounted to the part-mounting metal member can be transmitted smoothly to wide areas of the overall skin layers of the sandwich structure, thereby avoiding the concentration of stress in the sandwich structure.

The inventors have further found that by providing a vehicle body of a sandwich structure with an engine-mounting portion comprising a tapered recess and a projected portion having an engaging portion at its lower end, and by fixedly mounting an engine-mounting metal member having a tapered dent complementary to the tapered recess of the sandwich structure and a bent portion engageable with the projected portion to the engine-mounting portion of the sandwich structure by an adhesive and a bolt, a load of an engine mounted to the engine-mounting metal member can be transmitted smoothly to wide areas of the overall skin layers of the sandwich structure, thereby avoiding the concentration of stress in the sandwich structure.

The inventors have further found that by providing a vehicle floor of a sandwich structure integrally with surfaces for receiving seat slide rails, the resulting seat slide rail-mounting structure can have high strength.

The present invention is based on these findings.

Thus, the part-mounting portion of a sandwich structure according to the first embodiment of the present invention is constituted by a core layer and plastic skin layers formed on both surfaces of the core layer, at least one of the skin layers having a tapered recess having a sloped side wall and a flat bottom wall, and the bottom wall being constituted by the skin layers bonded together.

The part-mounting metal member according to the first embodiment of the present invention is constituted by a core layer and plastic skin layers formed on both surfaces of the core layer, at least one of the skin layers having a tapered recess having a sloped side wall and a flat bottom wall, the bottom wall being constituted by the skin layers bonded together, the part-mounting metal member having a bottom plate, and a pair of side plates vertically extending from the bottom plate substantially on both sides, at least one of the side plates having a dent tapered complementarily to the tapered recess of the sandwich structure.

The part-mounting structure according to the first embodiment of the present invention is constituted by a core layer and plastic skin layers formed on both surfaces of the core layer, and a part-mounting metal member, at least one of the skin layers having a tapered recess having a sloped side wall and a flat bottom wall, the bottom wall being constituted by the skin layers bonded together, the part-mounting metal member having a bottom plate, and a pair of side plates vertically extending from the bottom plate substantially on both sides, at least one of the side plates having a dent tapered complementarily to the tapered recess of the sandwich structure, and the part-mounting metal member being mounted to the part-mounting portion of the sandwich structure with a surface of the tapered recess of the sandwich structure and a surface of the tapered dent of the part-mounting metal member bonded together by an adhesive.

The pair of front suspension beam-mounting portions according to the second embodiment of the present invention are formed in a lower edge portion of a front frame at front and rear positions (two positions) in a vehicle body of a sandwich structure constituted by core layer and plastic skin layers formed on both surfaces of the core layer, and in each front suspension beam-mounting portion, at least one of the skin layers having a tapered recess having a sloped side wall and a flat bottom wall, the bottom wall being constituted by the skin layers bonded together, and the tapered recess opening toward the edge of the sandwich structure.

The metal member for mounting a front suspension beam to each front suspension beam-mounting portion of a vehicle body of a sandwich structure constituted by a core layer and plastic skin layers according to the second embodiment of the present invention has a bottom plate, and a pair of side plates vertically extending from the bottom plate substantially on both sides, at least one of the side plates having a dent tapered complementarily to the tapered recess of the sandwich structure.

The front suspension beam-mounting structure according to the second embodiment of the present invention comprises (a) a pair of front suspension beam-mounting portions of a vehicle body of a sandwich structure constituted by a core layer and plastic skin layers, the front suspension beam-mounting portions being formed in a lower edge portion of a front frame at front and rear positions (two positions), and in each front suspension beam-mounting portion, at least one of the skin layers having a tapered recess having a sloped side wall and a flat bottom wall, the bottom wall being constituted by the skin layers bonded together, the tapered recess opening toward the edge of the sandwich structure, and (b) a pair of front suspension beam-mounting metal members each having a bottom plate and a pair of side plates vertically extending from the bottom plate substantially on both sides, at least one of the side plates having a dent tapered complementarily to the tapered recess of the sandwich structure, each of the front suspension beam-mounting metal members being mounted to each of the front suspension beam-mounting portions of the sandwich structure with a surface of the tapered recessed of the sandwich structure and a surface of the tapered dent of the front suspension beam-mounting metal member bonded together by an adhesive.

The pair of upper arm-mounting portions according to the third embodiment of the present invention are formed in a lower edge portion of a front frame at front and rear positions (two positions) in a vehicle body of a sandwich structure constituted by a core layer and plastic skin layers formed on both surfaces of the core layer, in each upper arm-mounting portion, at least one of the skin layers being provided with a tapered recess having a sloped side wall and a flat bottom wall, the bottom wall being constituted by the skin layers bonded together, and the tapered recess opening toward the edge of the sandwich structure.

The metal member for mounting an upper arm to each upper arm-mounting portion of a vehicle body of a sandwich structure according to the third embodiment of the present invention has a bottom plate, a pair of first side plates vertically extending from one side of the bottom plate substantially on both lateral sides, and a pair of second side plates extending from the other side of the bottom plate for supporting the upper arm; at least one of the first side plates having a dent tapered complementarily to the tapered recess of the sandwich structure.

The upper arm-mounting structure according to the third embodiment of the present invention comprises (a) a pair of upper arm-mounting portions of a vehicle body of a sandwich structure constituted by a core layer and plastic ski layers, the upper arm-mounting portions being formed in a lower edge portion of a vehicle frame of the sandwich structure at front and rear positions (two positions), in each upper arm-mounting portion, at least one of the skin layers having a tapered recess being provided with a sloped side wall and a flat bottom wall, the bottom wall being constituted by the skin layers bonded together, and the tapered recess opening toward the edge of the sandwich structure; and (b) a pair of upper arm-mounting metal members each having a bottom plate, a pair of first side plates vertically extending from one side of the bottom plate substantially on both lateral sides, and a pair of second side plates extending from the other side of the bottom plate for supporting the upper arm, at least one of the first side plates having a dent tapered complementarily to the tapered recess of the sandwich structure; each of the upper arm-mounting metal members being mounted to each of the upper arm-mounting portions of the sandwich structure with surfaces of the tapered recesses of the sandwich structure and surfaces of the tapered dents of the first side plates of the upper arm-mounting metal members bonded together by an adhesive.

The first engine-mounting portion of a vehicle body of a sandwich structure constituted by a core layer and plastic skin layers according to the fourth embodiment of the present invention is constituted by a core layer and plastic skin layers formed on both surfaces of said core layer, at least one of said skin layers having a tapered recess having a sloped side wall and a flat bottom wall, and said bottom wall being constituted by said skin layers bonded together.

The first metal member for mounting an engine to a first engine-mounting portion of a vehicle body of a sandwich structure according to the fourth embodiment of the present invention has a bottom plate, a pair of first side plates vertically extending from one side of the bottom plate substantially on both lateral sides, and a pair of second side plates extending from the other side of the bottom plate for supporting the engine; at least one of the first side plates having a dent tapered complementarily to the tapered recess of the sandwich structure.

The fist engine-mounting structure according to the fourth embodiment of the present invention comprises (a) a first engine-mounting portion of a vehicle body of a sandwich structure constituted by a core layer and plastic ski layers formed on both surfaces of said core layer, at least one of said skin layers having a tapered recess having a sloped side wall and a flat bottom wall, and said bottom wall being constituted by said skin layers bonded together; and (b) a first metal member for mounting an engine to the engine-mounting portion, the engine-mounting metal member having a bottom plate, a pair of first side plates vertically extending from one side of the bottom plate substantially on both lateral sides, and a pair of second side plates extending from the other side of the bottom plate for supporting the engine; at least one of the first side plates having a dent tapered complementarily to the tapered recess of the sandwich structure.

The second engine-mounting portion of a vehicle body of a sandwich structure constituted by a core layer and plastic skin layers according to the fifth embodiment of the present invention comprises a first ski layer on the engine side formed with a first tapered recess having a sloped side wall and a flat bottom wall, and a projected portion located below the first tapered recess and having an engaging portion at its lower end, and a rear skin layer on the back side provided with a second tapered recess at a position corresponding to the first tapered recess, so that the bottom walls of the first tapered recess and the second tapered recess are bonded together.

The second metal member for mounting an engine to a second engine-mounting portion of a vehicle body of a sandwich structure according to the fifth embodiment of the present invention is constituted by (a) a first metal piece which is in shape covering the first tapered recess and the projected portion of the front skin layer on the engine side, and has a bent portion engageable with the engaging portion of the projected portion and a pair of side plates extending from both lateral sides of the first metal piece for supporting the engine, and (b) a second metal piece which is in a shape covering the second tapered recess of the rear skin layer; the first metal piece and the second metal piece being fastened by a bolt at a position where the first and second tapered recesses are bonded together.

The second engine-mounting structure according to the fifth embodiment of the present invention comprises (a) a second engine-mounting portion of a vehicle body of a sandwich structure constituted by a core layer and plastic skin layers formed on both surfaces of the core layer, a front skin layer on the engine side being formed with a first tapered recess having a sloped sided wall and a flat bottom wall, and a projected portion located below the first tapered recess and having an engaging portion at its lower end, and a rear skin layer on the back side being provided with a second tapered recess at a position corresponding to the first tapered recess, so that the bottom walls of the first tapered recess and the second tapered recess are bonded together, and (b) a second engine-mounting metal member constituted by (i) a first metal piece which is in a shape covering the first tapered recess and the projected portion of the front skin layer on the engine side, and has a bent portion engageable with the engaging portion of the projected portion and a pair of side plates extending from both lateral sides of the first metal piece for supporting the engine and (ii) a second metal piece which is in shape covering the second tapered recess of the rear skin layer; the first metal piece and the second metal piece being fastened by a bolt at a position where the first and second tapered recesses are bonded together.

The third engine-mounting portion of a vehicle body of a sandwich structure constituted by a core layer and plastic skin layers formed on both surfaces of the core layer according to the sixth embodiment of the present invention comprises a first portion located on the engine side, and a second portion located below the first portion and oriented in a different direction from that of the first portion, in each of the first and second portions, at least one of the skin layers having a tapered recess having a sloped side wall and a flat bottom wall, and the bottom wall being constituted by the skin layers bonded together.

The third metal member for mounting an engine to a third engine-mounting portion of a vehicle body of a sandwich structure according to the sixth embodiment of the present invention comprises (a) a metal piece having a shape covering a tapered recess of the first portion formed on the engine side and a tapered recess of the second portion, and having a pair of side plates extending forward from both side edges thereof for supporting the engine; (b) a second metal piece having a shape covering another tapered recess of the first portion on the back side (c) and a third metal piece having a shape covering another tapered recess of the second portion.

The third engine-mounting structure according to the sixth embodiment of the present invention comprises (a) a third engine-mounting portion of a vehicle body of a sandwich structure constituted by a core layer and plastic skin layers formed on both surfaces of the core layer, the third engine-mounting portion comprising a first portion located on the engine side, and a second portion located below the first portion and oriented in a different direction from that of the first portion, in each of the first and second portions, at least one of the skin layers having a tapered recess having a sloped side wall and a flat bottom wall, and the bottom wall being constituted by the skin layers bonded together; and (b) a third metal member for mounting an engine to the third engine-mounting portion, the third engine-mounting metal member comprising (ii) a first metal piece having a shape covering a tapered recess of the first portion formed on the engine side and a tapered recess of the second portion, and having a pair of side plates extending forward from both side edges thereof for supporting the engine; (ii) a second metal piece having a shape covering another tapered recess of the first portion on the back side; and (iii) a third metal piece having a shape covering another tapered recess of the second portion, the first metal piece being fixed to the engine-mounting portion of the sandwich structure on the engine side, the second metal piece being fixed to the tapered recess of the first portion on the back side the third metal piece being fixed to the tapered recess of the second portion on the opposite side to the first metal piece, the second metal piece and the third metal piece being fastened to the first metal piece by bolts in the first and second portion.

The part-mounting portion of a floor panel of a sandwich structure constituted by a core layer and plastic skin layers formed on both surfaces of the core layer according to the seventh embodiment of the present invention comprises one of the skin layers a recess having a side wall and a flat bottom wall, and the other skin layer being flat, the bottom wall being directly bonded to the flat skin layer to provide a flat bonded portion, and the flat bonded portion being provided with a hole for a bolt.

The part-mounting structure for a floor panel according to the seventh embodiment of the present invention comprises (a) a part-mounting portion of a floor panel of a sandwich structure constituted by a core layer and plastic skin layers formed on both surfaces of the core layer, one of the ski layers being provided with a recess having a side wall and a flat bottom wall, and the other skin layer being flat, the bottom wall being directly bonded to the flat skin layer to provide a flat bonded portion, and the flat bonded portion being provided with a hole for a bolt; and (b) a metal member having a shape of covering the tapered recess and having a hole for mounting the part at a position corresponding to the hole in the tapered recess; the part being mounted to the part-mounting portion of the sandwich structure via the metal member by a bolt.

The part-mounting portion of a vehicle body of a sandwich structure constituted by a core layer and plastic skin layers according to the eighth embodiment of the present invention is provided in each of the skin layers with a recess having a side wall and a flat bottom wall, and the bottom wall having a hole for mounting the part in an area in which the skin layers are directly bonded together.

The part-mounting structure according to the eighth embodiment of the present invention comprises (a) a part-mounting portion of a sandwich structure constituted by a core layer and plastic skin layers, each of the skin layers being provided with a recess having a side wall and a flat bottom wall, and the bottom wall having a hole for mounting the part in an area in which the skin layers are directly bonded together; and (b) a pair of part-mounting metal members each having a shape capable of being in close contact with the bottom wall and at least part of the side wall, and having a hole for mounting the part at a position corresponding to the hole in the area of the bottom wall; the part-mounting metal members being mounted to the part-mounting portion of the sandwich structure with an elastic block filled in each metal member in such a manner that the elastic block encloses a rod-shaped end of the part, which is threaded to a nut via a washer.

The seat slide rail-mounting structure according to the ninth embodiment of the present invention comprises a vehicle floor of a sandwich structure constituted by a core layer and a pair of plastic skin layers, said vehicle floor being integrally formed with axial recesses or ridges each having an axial ledge, to which said seat slide rails are fixedly mounted.

DETAILED DESCRIPTION OF THE INVENTION

Figure 1:
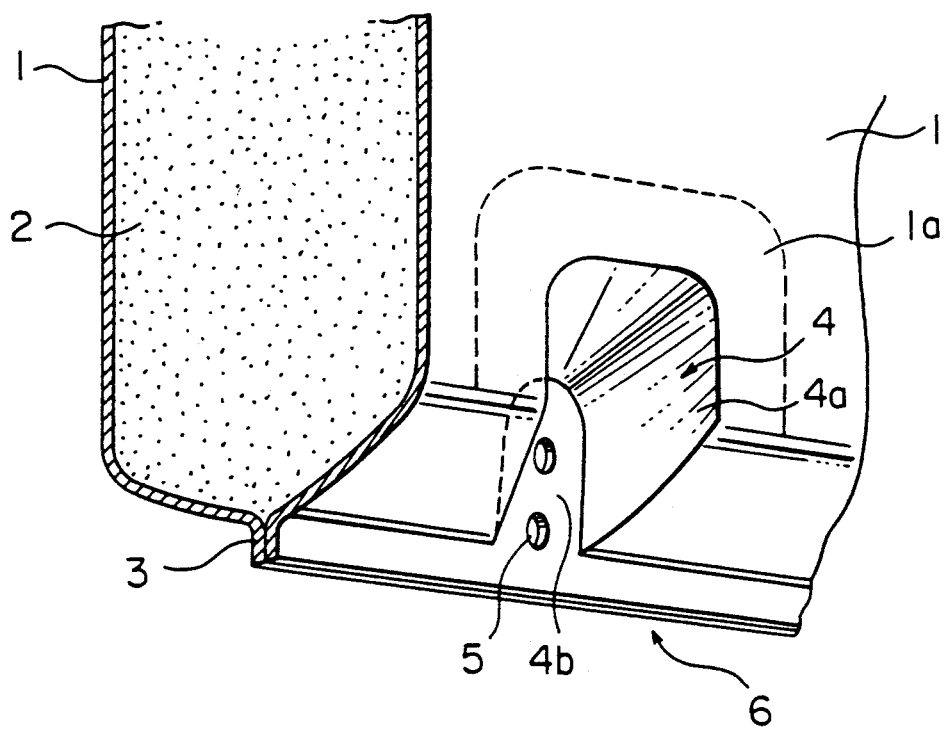
FIG. 1 is a partially cut perspective view showing the part-mounting portion of a sandwich structure according to the first embodiment of the present invention.

FIG. 1 is a partial perspective view showing the part-mounting portion of a sandwich structure according to the first embodiment of the present invention. The sandwich structure is constituted by a core layer 2 made of a foamed material and a pair of skin layers 1, 1 formed on both surfaces of the core layer 2. In an edge portion of the sandwich structure, both ski layers 1, 1 are bonded together to form a flange portion 3.

In the part-mounting portion 6 of this sandwich structure, the ski layers 1, 1 are provided with tapered recesses 4, 4 symmetrically formed on both surfaces. Each tapered recess 4 comprises a sloped side wall 4a and a flat bottom wall 4b, and in the bottom wall 4b both skin layers 1, 1 are bonded together. In this embodiment, the tapered recess 4 is opened toward the edge portion of the sandwich structure, and the bottom wall 4b is coplanar with the flange portion 3. The sloped side wall 4a is in an elongated shape, and is constituted by flat side wall portions and conical side wall portions. Incidentally, the bottom wall 4b is provided with a plurality of holes 5 for receiving bolts for mounting a part-mounting metal member.

Figure 2:
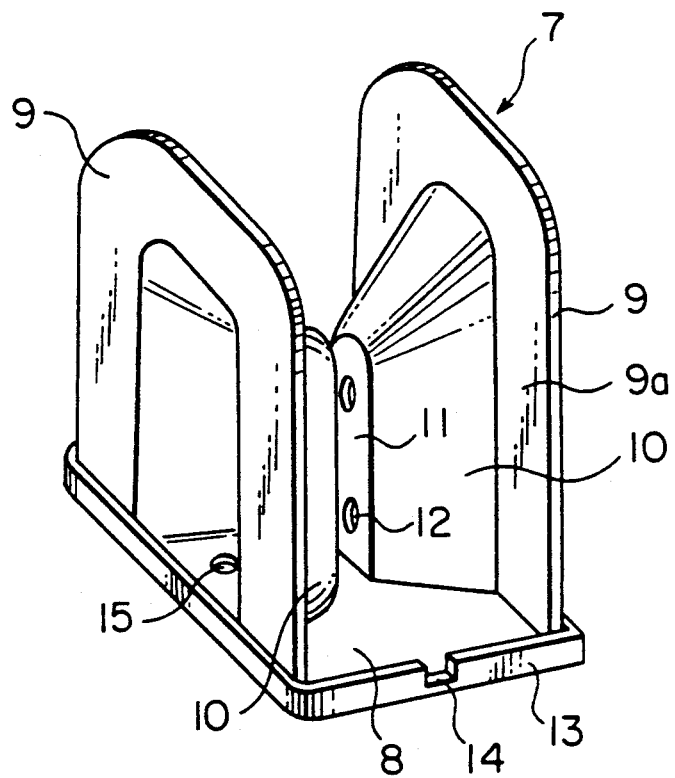
FIG. 2 is a perspective view showing the part-mounting metal member to be bonded to the part-mounting portion shown in FIG. 1.

FIG. 2 is a perspective view showing a part-mounting metal member 7 to be fixedly mounted to the part-mounting portion shown in FIG. 1. The part-mounting metal member 7 comprises a bottom plate 8, and a pair of side plates 9, 9 vertically extending from the bottom plate 8 substantially on both sides.

Each of the side plates 9,9 is provided with a tapered dent 10, 10 which is shaped complementarily to the tapered recess 4 of the sandwich structure shown in FIG. 1. Incidentally, since a space between these tapered dents 10, 10 receives the bottom wall 4b constituted by both skin layers bonded together, its gap is equal to or slightly larger than the thickness of the bottom wall 4b. Opposing portions 11,11 of the tapered dents 10, 10 are also provided with a plurality of holes 12 for bolts at positions corresponding to the holes 5.

The bottom plate 8 of the part-mounting metal member 7 is provided with a plurality of bolt holes 15 for mounting a part. An edge portion of the bottom plate 8 is bent upwardly to provide a bent fringe portion 13. This bent fringe portion 13 is provided with notches 14, 14 (only one is shown in FIG. 2) at centers of sides perpendicular to the side plates 9, 9 for permitting the flange portion 3 of the sandwich structure to extend therethrough.

Figure 3:
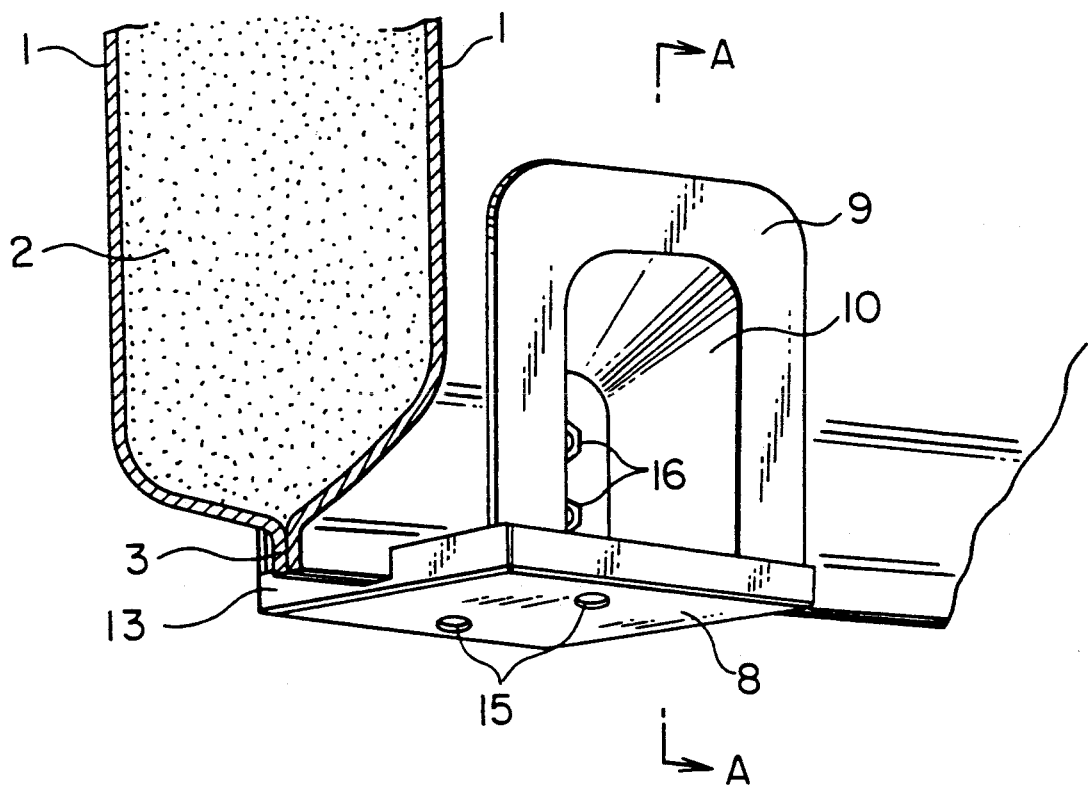
FIG. 3 is a partially cut perspective view showing the part-mounting metal member of FIG. 2 fixedly mounted to the part-mounting portion of FIG . 1.
Figure 4:
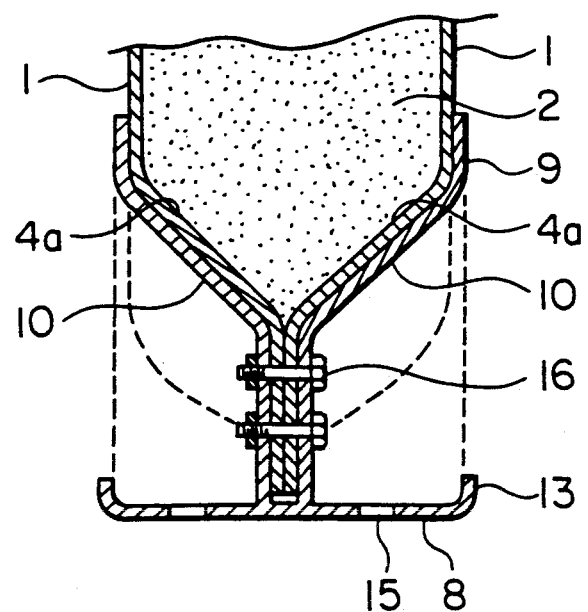
FIG. 4 is a cross-sectional view taken along to the line A—A in FIG. 3.

FIG. 3 is a partially cut perspective view showing the part-mounting metal member 7 of FIG. 2 fixedly mounted to the part-mounting portion 6 of the sandwich structure shown in FIG. 1, and FIG. 4 is an A—A cross-sectional view showing the part-mounting structure shown in FIG. 3.

As is clear from FIG. 4, the tapered recesses 4, 4 of both skin layers 1, 1 of the sandwich structure are in complete contact with the tapered dents 10, 10 of the part-mounting metal member 7 in entire surfaces. In this state, the tapered recesses 4, 4 and the tapered dents 10, 10 are fixedly bonded together by an adhesive. As shown in FIG. 4, since the holes of the tapered dents 10, 10 of the side plates 9, 9 are aligned with the holes 5 of the bottom wall 4b of the tapered recesses 4, 4, they are fixed by bolts 16 extending therethrough.

A part can be mounted to the bottom plate 8 of the part-mounting metal member 7 by bolts threaded to the holes 15. A load exerted by the part mounted is transmitted to both side plates 9, 9 via the bottom plate 8 of the part-mounting metal member 7 and then uniformly transmitted via the tapered dents 10, 10 to the tapered recesses 4, 4 of the both skin layers 1, 1 fixed to the part-mounting metal member 7.

Since the tapered recesses 4, 4 are fixed to the complementarily tapered dents 10, 10, a load of any direction can be sustained by some portions of the part-mounting portion having enough strength.

Specifically speaking, in the figure, when an upward load is applied, the load is sustained by the upper, conical side wall portions of the tapered recesses 4, 4. On the other hand, when a downward load is applied, the load is sustained by the surfaces 1a and 9a. In general, a shear strength of adhesion is much larger than a peeling strength, the structure in which a load is sustained by this shearing strength is extremely advantageous in strength.

Further, when a lateral load is applied, both lateral side wall portions of the tapered recesses 4, 4 sustain the load sufficiently.

In addition, when a torsional load is applied, the torsional load can be sustained by the overall surfaces of the adhered walls of the tapered recesses 4, 4, because both overall tapered surfaces of the sandwich structure and the part-mounting metal member are fixed by adhesion. Moreover, since the tapered dents 10, 10 are fixed by adhesion. Moreover, since the tapered dents 10, 10 are fixed on both surfaces, a torsional load of any direction is transmitted as a pressing force to the tapered recesses in some portions on both surfaces. In other words, a force of peeling direction in a portion is inevitably a force in a pressing direction in another portion. Accordingly, the torsional load is sufficiently sustained by some of those portions. This means that a torsional load is not applied only as a peeling force to the bonded boundaries between the tapered recesses 4, 4 and the tapered dents 10, 10. Incidentally, even when one of the skin layers 1, 1 is flat, the skin layers 1, 1 are fixed to both side plates 9, 9 of the part-mounting metal member 7 simultaneously on both surfaces of the tapered recess 4 and the flat portion, so that it is sufficiently strengthened against a torsional load.

As described above, a load exerted from the part is fully sustained by the bonded portions between the tapered recesses 4, 4 of the skin layers 1, 1 and the tapered dents 10, 10 of the part-mounting metal member 7 and between the portion 1a in FIG. 1 and the portion 9a in FIG. 2. However, for the purposes of reinforcement and fail-save, the part-mounting metal member is fixed to the part-mounting portion 6 of the sandwich structure by bolts 16, so that the part-mounting metal member 7 is not detached even when the adhesion is broken.

Bent fringe portion 13 of the bottom plate 8 of the part-mounting metal member 7 is for reinforcement of the bottom plate 8, and the notches 14, 14 provided in this bent fringe portion 13 are for permitting the flange portion 3 of the sandwich structure to extend therethrough. Accordingly, the flange portion 3 itself is not notched, serving to maintain the strength of the sandwich structure itself.

The part-mounting structure according to the first embodiment of the present invention has been explained referring to the attached drawings, but the present invention is not restricted thereto, and any modifications can be made unless they deviate from the scope of the present invention. For instance, instead of providing a pair of tapered recesses symmetrically in the skin layers, only one skin layer can be provided with a tapered recess while another skin layer is kept flat, so that a part-mounting metal member having side plates, only one of which is provided with a tapered dent, can be used. With respect to the shape of the tapered recesses of the skin layers, it is not restricted to an elongated one. As long as it has a sloped side wall, it may have any shape depending upon its applications.

As described above in detail, the part-mounting structure according to the first embodiment of the present invention can serve to transmit a load applied to the part to the overall surfaces of the sandwich structure. Also, since the part-mounting metal member is fixed to the sandwich structure with the tapered recesses of the sandwich structure adhered to the complementarily tapered dents of the part-mounting metal member, the part-mounting structure of the present invention is sufficiently strong to a load applied to a part in any direction including vertical, lateral and torsional directions.

Figure 5:
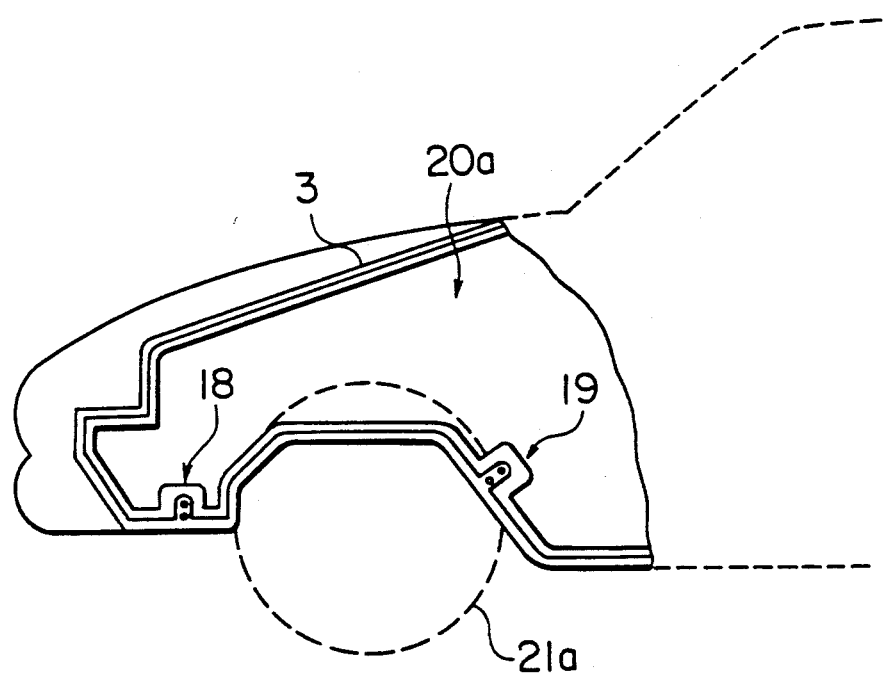
FIG. 5 is a schematic side view showing the positions of front suspension beam-mounting portions in the vehicle body of a sandwich structure according to the second embodiment of the present invention.

FIG. 5 is a schematic side view showing the positions of the front suspension beam-mounting portions of FIG. 1 in the sandwich structure according to the second embodiment of the present invention. The front suspension beam-mounting portions 18, 19 are provided in a lower edge portion of a front frame 20a, which is a part of the vehicle body constituted by the sandwich structure. A vehicle has a pair of front frames on both lateral sides, and the front frames extend forward from the center portion of the vehicle body inside the front wheels 21a, 21a substantially in parallel therewith. FIG. 5 shows a front frame 20a on the left side, and a front frame on the right side (not shown) is also provided with front suspension beam-mounting portions.

In the front suspension beam-mounting portions 18, 19, the rear mounting portion 19 is located at a slightly higher position than the front mounting portion 18. Also the front mounting portion 18 opens just downward, while the rear mounting portion 19 opens toward the downwardly inclined forward direction with respect to the vehicle body.

The front suspension beam-mounting portions 18, 19 do not necessarily have the same size, but the shapes of the front suspension-mounting portions are essentially similar to those shown in FIG. 1.

A front suspension beam-mounting metal member to be fixedly mounted to the front suspension beam-mounting portion has essentially the same shape as shown in FIG. 1.

As shown in FIG. 3, the front suspension beam-mounting metal member can be fixedly mounted to the front suspension beam-mounting portion 6 of the sandwich structure which may be the same as shown in FIG. 1.

Figure 6:
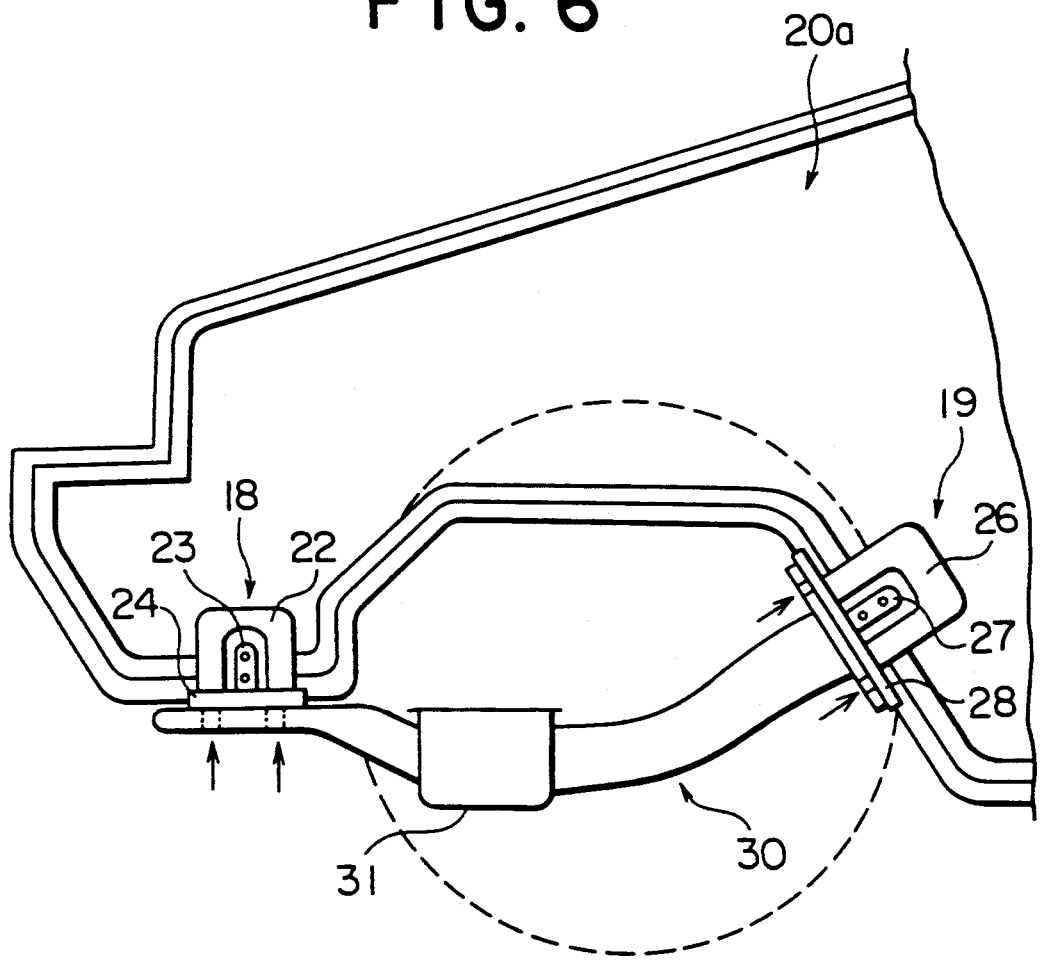
FIG. 6 is a schematic side view showing the front suspension beam fixed to the front suspension beam-mounting portions of the sandwich structure.

FIG. 6 schematically shows that the metal members 22, 26 having the shape shown in FIG. 2 and also having dents tapered complementarily to the tapered recesses of the front suspension beam-mounting portion are fixedly mounted to the front suspension beam-mounting portions 18, 19 of the front frame 20a, and that the front suspension beam 30 is mounted to the front suspension beam-mounting metal members 22, 26.

The front suspension beam 30 is fixed to the front frame 20a at both ends thereof, with bolts threaded into the holes of the bottom plates 24, 28 of the metal members 22, 26 fixed to the front suspension beam-mounting portions 18, 19 of the front frame 20a at positions shown by the arrows.

Extending through a box 31 provided in the front suspension beam 30 at its center position is a leaf suspension extending laterally. The front suspension beam 30 is bent such that its rear end is directed slightly upward. Thus, the front suspension beam 30 is fixed at its rear end to the rear mounting portion 19 substantially in perpendicular to the bottom plate 28 of the metal member 26. Accordingly, the axial direction of the front suspension beam 30 is substantially coincident with the directions of bolts for mounting the front suspension beam 30 to the sandwich structure.

By such a structure for mounting the front suspension beam 30 to the front frame 20a, an external force exerted the front is sustained by the bottom plate 28 of the metal member 26, and it is transmitted to the skin layers of the front frame 20a via the side plates of the metal member 26, whereby such an external force can be smoothly transmitted to the vehicle body in parallel with a vehicle floor. Specifically speaking, in the front suspension beam-mounting portion 19, a force exerted from the front via the front suspension beam 30 is sustained by the adhesion boundary between the side plates of the metal member 26 and the skin layers of the sandwich structure, whereby the force can be transmitted to the skin layers of the front frame without concentration in any particular portion. In this case, since the directions of the bolts for mounting the front suspension beam 30 to the metal member 26 are the same as that of the force, the breakage of the bolts can be avoided.

As described above, a large force which may be exerted from the front by collision, etc. is transmitted to the overall vehicle body through the front suspension beam-mounting metal member 26 fixed to the front suspension beam-mounting portion 19 of the sandwich structure, so that such an external force can be absorbed by a large mass of the overall vehicle body. As a result, the vehicle body of this structure exhibits good shock resistance.

The front suspension beam-mounting structure according to the second embodiment of the present invention is strong enough not only to a force from the front but also to a force of any direction for the reasons as described above in connection with the first embodiment.

As in the case of the part-mounting structure shown in FIG. 3, a load exerted from the front suspension beam is fully sustained by the bonded portions between the tapered recesses 4, 4 of the skin layers 1, 1 and the tapered dents 10, 10 of the front suspension beam-mounting metal member 7 and between the portion 1a in FIG. 1 and the portion 9a in FIG. 2. However, for the purposes of reinforcement and fail-safe, the front suspension beam-mounting metal members 22, 26 are fixed to the front suspension beam-mounting portions 18, 19 of the sandwich structure by bolts 16, so that the front suspension beam-mounting metal members 22, 26 are not detached even when the adhesion is broken.

The front suspension beam-mounting structure according to the second embodiment of the present invention has been explained referring to the attached drawings, but the present invention is not restricted thereto, and any modifications can be made unless they deviate from the scope of the present invention as in the case of the first embodiment.

The front suspension beam-mounting structure according to the second embodiment of the present invention can serve to transmit a load applied to the front suspension beam to the overall surfaces of the sandwich structure as described above in connection with the first embodiment.

In addition, since the rear end portion of the front suspension beam is bent slightly upward, the axial direction of the bottom plate of the front suspension beam is substantially perpendicular to the front suspension beam-mounting metal member fixed to the front frame at a rear mounting portion thereof. Accordingly, a force exerted from the front through the front suspension beam can be sustained by the bottom plate of the front suspension beam-mounting metal member at the rear position. The force is then transmitted to the overall vehicle body smoothly via the side plates of the metal member. Therefore, the front suspension beam-mounting structure of the present invention is sufficiently strong to withstand a shock exerted from the front.

Figure 7:
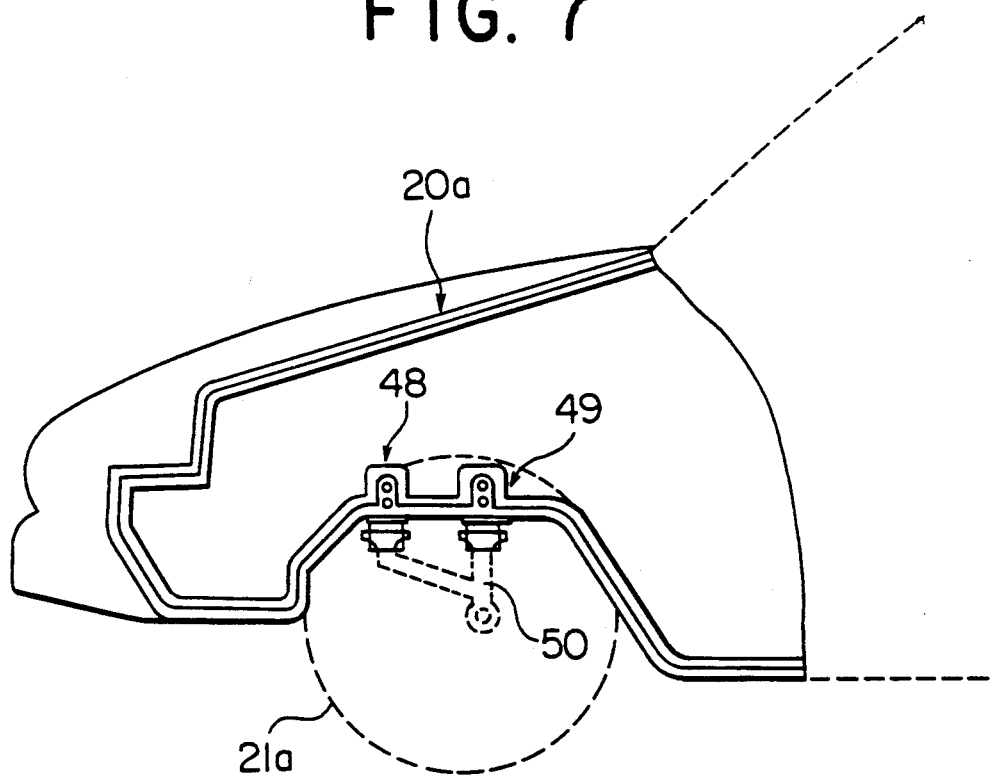
FIG. 7 is a schematic side view showing the positions of the upper arm-mounting portions in the vehicle body of a sandwich structure.

FIG. 7 is a schematic side view showing the positions of the upper arm-mounting portions of FIG. 1 in the vehicle body of 48 the sandwich structure according to the third embodiment of the present invention. The upper arm-mounting portions 48, 49 are provided in a lower edge portion of a front frame 20a, which is a part of the vehicle body constituted by the sandwich structure. A vehicle has a pair of front frames on both lateral sides, and the front frames extend forward from the center portion of the vehicle body inside the front wheels 21a, 21a substantially in parallel therewith. FIG. 7 shows a front frame 20a on the left side, and a front frame on the right side (not shown) is also provided with the same upper arm-mounting portions.

The recesses of the upper arm-mounting portions 48, 49 do not necessarily have the same size, but the shapes of the recesses are essentially similar to the recess 4 shown in FIG. 1.

With respect to a rear upper arm, they can be mounted to a rear frame of the vehicle body like the front upper arm.

Figure 8:
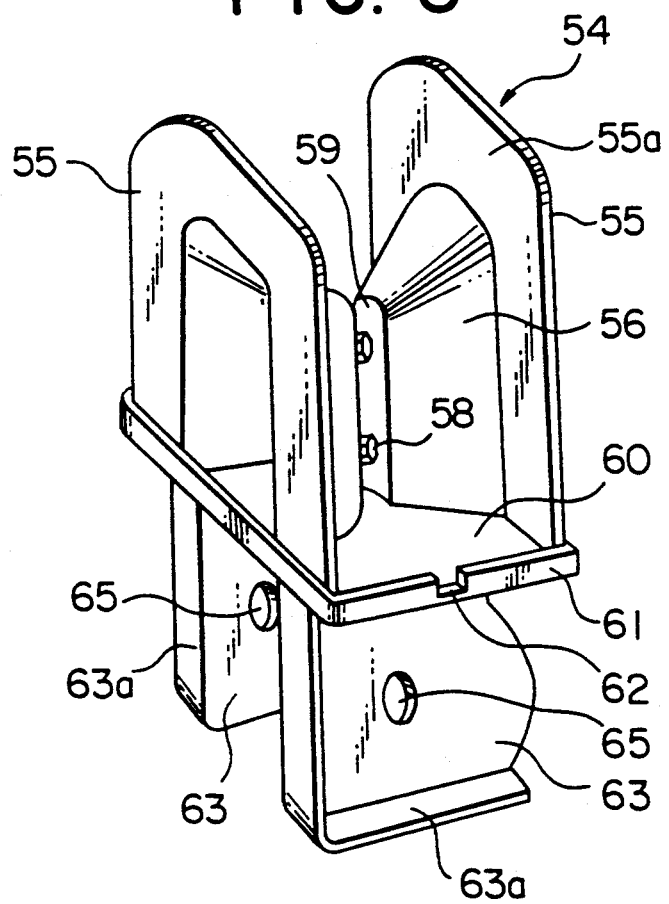
FIG. 8 is a perspective view showing the upper arm-mounting metal member to be bonded to the upper arm-mounting portion shown in FIG. 7 according to the third embodiment of the present invention.

FIG. 8 is a perspective view showing an upper arm-mounting metal member 54 to be fixedly mounted to the upper arm-mounting portion having the same configuration as shown in FIG. 7. The upper arm-mounting metal member 54 comprises a bottom plate 60, and a pair of first side plates 55, 55 vertically extending from one side of the bottom plate 60 substantially on both lateral sides. Each of the first plates 55, 55 is provided with a tapered dent 56, 56 which is shaped complementarily to the tapered recess 4 of the sandwich structure shown in FIG. 1. Incidentally, since a space between these tapered dents 56, 56 receives the bottom wall 4b constituted by bonded skin layers 1, 1 shown in FIG. 1, its gap is equal to or slightly larger than the thickness of the bottom wall 4b. Opposing portions 59, 59 of the tapered dents 56, 56 are also provided with a plurality of holes 58 for bolts at positions corresponding to the holes 5.

The bottom plate 60 of the metal member 54 is also provided with a pair of second side plates 64, 64 extending from the other side thereof for mounting an upper arm. Each side plate 63 is provided with a bent fringe portion 63a and a hole 65 for mounting the upper arm.

An edge portion of the bottom plate 60 is bent upwardly to provide a bent fringe portion 61. This bent fringe portion 61 is provided with notches 62, 62 (only one is shown in FIG. 8) at centers of sides perpendicular to the first side plates 55, 55 for permitting the flange portion 3 of the sandwich structure to extend therethrough.

Figure 9:
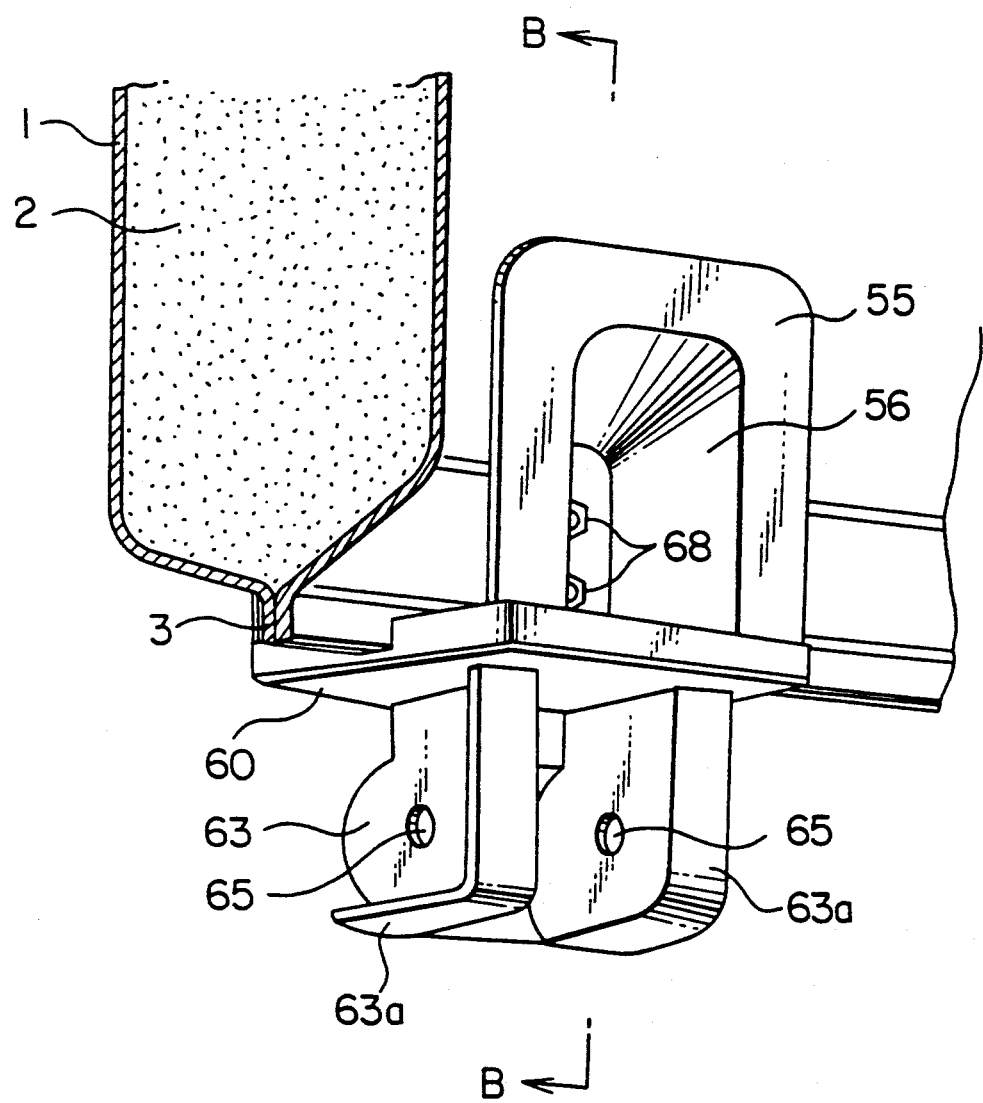
FIG. 9 is a partially cut perspective view showing the upper arm-mounting metal member of FIG. 8 fixedly mounted to the upper arm-mounting portion of FIG. 1.
Figure 10:
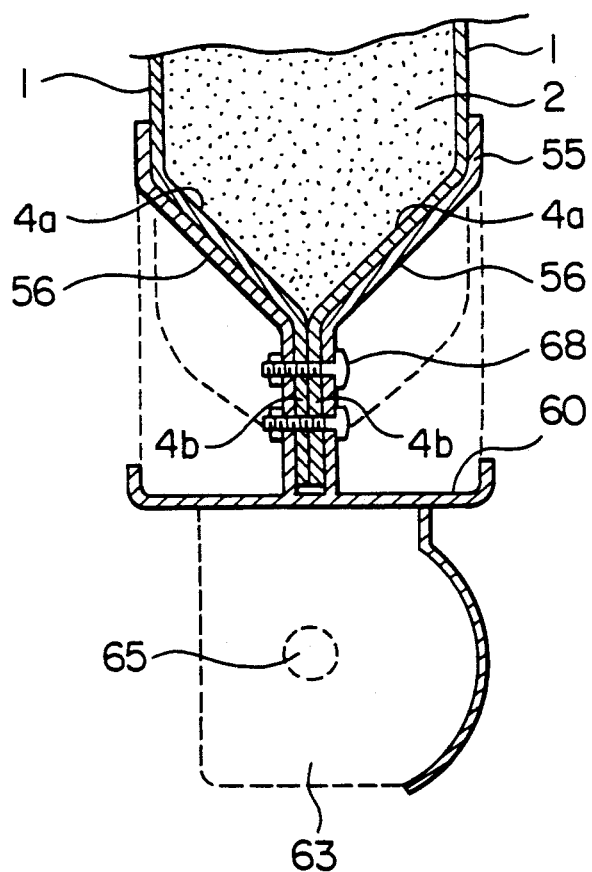
FIG. 10 is a cross-sectional view taken along the line B—B in FIG. 9.

FIG. 9 is a partially cut perspective view showing the upper arm-mounting metal member 54 of FIG. 8 fixedly mounted to the upper arm-mounting portion 6 of the sandwich structure, and FIG. 10 is a B—B cross-sectional view showing the upper arm-mounting structure shown in FIG. 9.

As is clear from FIG. 10, the tapered recesses 4, 4 of both skin layers 1, 1 of the sandwich structure are in complete contact with the tapered dents 56, 56 of the upper arm-mounting metal member 54 in entire surfaces 4a, 4b. In this state, the tapered recesses 4, 4 and the tapered dents 56, 56 are fixedly bonded together by an adhesive. As shown in FIG. 10, since the holes 58 of the tapered dents 56, 56 of the side plates 55, 55 are aligned with the holes 5 of the bottom wall 4b of the tapered recesses 4, 4, they are fixed by bolts 68 extending therethrough.

An upper arm 50 is mounted to the metal member by inserting its ends into the holes 65, 65 of the side plates 63, 63 in the upper arm-mounted portions 48, 49 as schematically shown in FIG. 7.

A load applied to the upper arm 50 is uniformly transmitted via both first side plates 55, 55 of the upper arm-mounting metal member 54 to the tapered recesses 4, 4 of the two skin layers 1, 1 to which the upper arm-mounting metal member 54 is fixed. Since the tapered recesses 4, 4 are fixed to the complementarily tapered dents 56, 56, a load of any direction can always be sustained by some portions of the upper arm-mounting structure having enough strength.

Specifically speaking, when an upward load is applied, the load is sustained by the upper, conical side wall portions of the tapered recesses 4, 4. On the other hand, when a downward load is applied, the load is sustained by the surface 1a and 55a. In general, a shear strength of adhesion is much larger than a peeling strength, the structure in which a load is sustained by this shearing strength is extremely advantageous in strength.

Further, when a lateral load is applied, both lateral side wall portions of the tapered recesses 4, 4 sustain the load sufficiently.

In addition, when a torsional load is applied, the torsional load can be sustained by the overall surfaces of the adhered walls of the tapered recesses 4, 4, because both overall tapered surfaces of the sandwich structure and the upper arm-mounting metal member are fixed by adhesion. Moreover, since the tapered dents 56, 56 are fixed on both surfaces, a torsional load of any direction is transmitted as a pressing force to the tapered recesses in some portions on both surfaces. In other words, a force of peeling direction in a portion is inevitably a force in a pressing direction in another portion. Accordingly, the torsional load is sufficiently sustained by some of those portions. This means that a torsional load is not applied only as a peeling force to the bonded boundaries between the tapered recesses 4, 4 and the tapered dents 56, 56.

As described above, a load exerted from the upper arm is fully sustained by the bonded portions between the tapered recesses 4, 4 of the skin layers 1, 1 and the tapered dents 56, 56 of the upper arm-mounting metal member 54 and between the portion 1a in FIG. 1 and the portion 55a in FIG. 8. However, for the purposes of reinforcement and fail-safe, the upper arm-mounting metal members are fixed to the upper arm-mounting portions 48, 49 of the sandwich structure by bolts 68, so that the upper arm-mounting metal members are not detached even when the adhesion is broken.

Bent fringe portion 61 of the bottom plate 60 of the upper arm-mounting metal member 54 is for reinforcement of the bottom plate 60, and the notches 62, 62 provided in this bent fringe portion 61 are for permitting the flange portion 3 of the sandwich structure to extend therethrough. Accordingly, the flange portion 3 itself is not notched, serving to maintain the strength of the sandwich structure itself.

The upper arm-mounting structure according to third embodiment of the present invention has been explained referring to the attached drawings, but the present invention is not restricted thereto, and any modifications can be made unless they deviate from the scope of the present invention, as described above in connection with the first embodiment. In addition, as mechanical fastening means in the tapered recess, any other means than bolts, for instance, rivets, etc. may be used.

As described above in detail, the upper arm-mounting structure of the present invention can serve to uniformly transmit a load applied to the upper arm to the overall surfaces of the sandwich structure.

Figure 11:
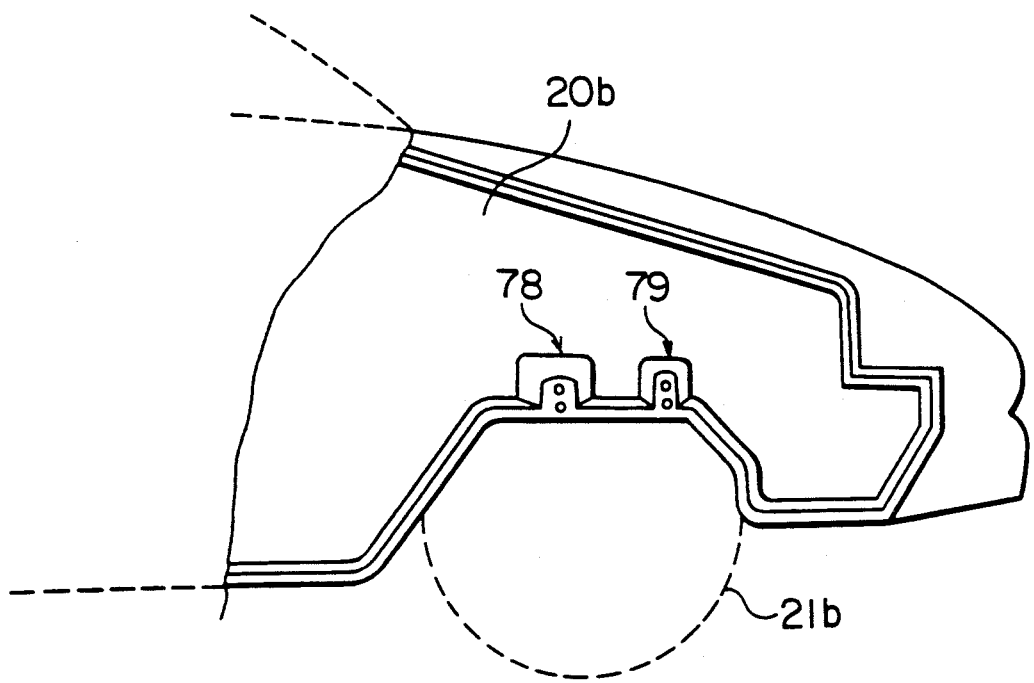
FIG. 11 is a schematic side view showing the position of the first engine-mounting portion in the vehicle body of a sandwich structure.
Figure 12:
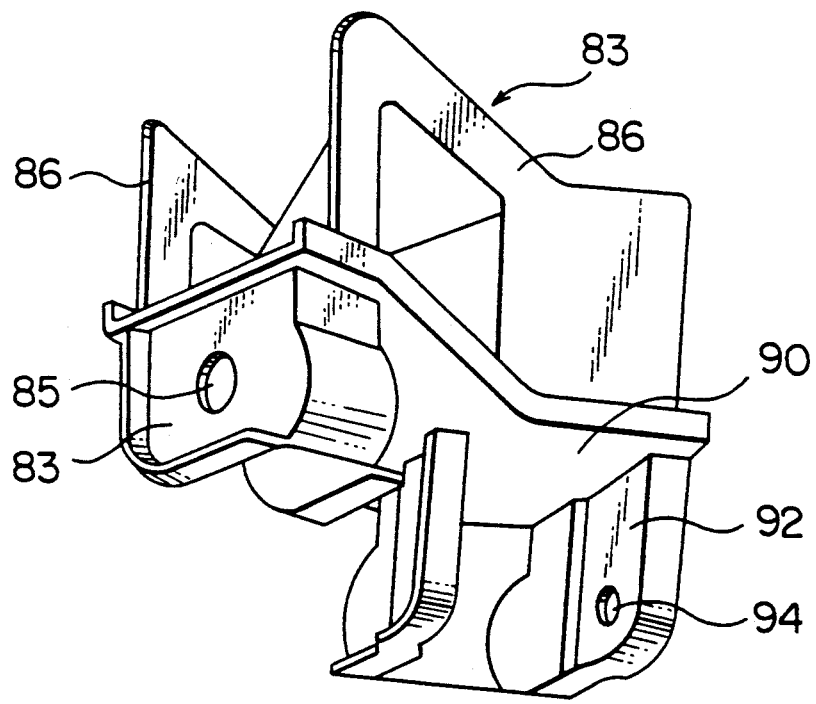
FIG. 12 is a perspective view showing the first engine-mounting metal member to be bonded to the fourth engine-mounting portion shown in FIG. 11 according to the fourth embodiment of the present invention.
Figure 13:
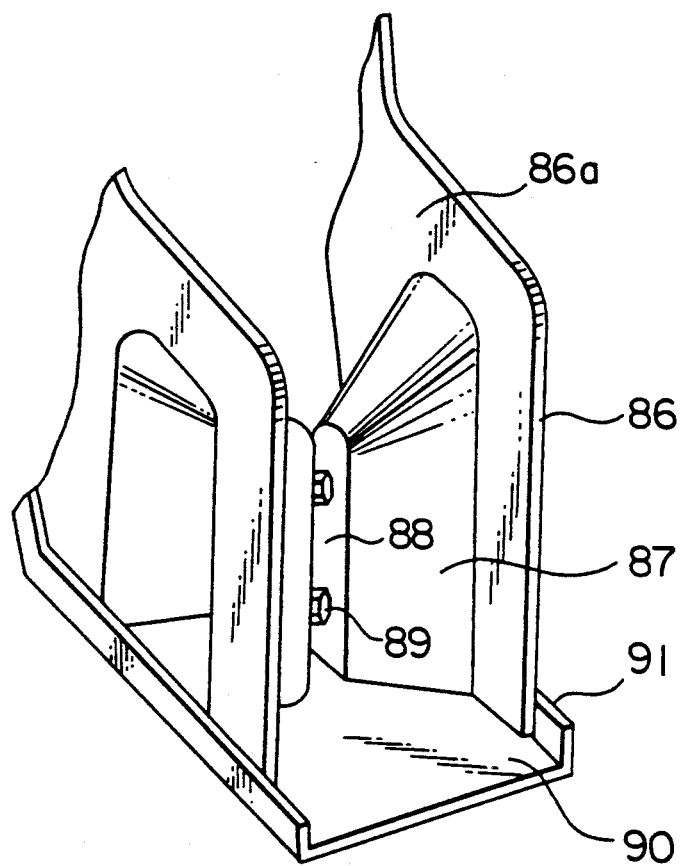
FIG. 13 is a partial perspective view showing a pair of side members of the first engine-mounting metal member of FIG. 12 to be fixedly mounted to the first engine-mounting portion of FIG. 11 according to the fourth embodiment of the present invention.

An engine is fixed to the vehicle body at three points or more. FIG. 11 is a schematic side view showing the position of a first engine-mounting portion 78 having a shape shown in FIG. 1 in the vehicle body of the sandwich structure. The first engine-mounting portion 78 according to the fourth embodiment of the present invention is provided in a lower edge portion of a front frame 20b, which is a part of the vehicle body constituted by the sandwich structure. A vehicle has a pair of front frames on both lateral sides, and the front frames extend forward from the center portion of the vehicle body inside the front wheels 21b, 21b substantially in parallel therewith. In this embodiment, the first engine-mounting portion 78 is formed in a lower edge portion of the front frame on the right side. Incidentally, a recess 7 9 near the first engine-mounting portion 78 is a portion for mounting a front upper arm, FIG. 12 is a perspective view showing a first engine-mounting metal member 83 to be fixedly mounted to the first engine-mounting portion having the same shape as shown in FIG. 1 according to the fourth embodiment of the present invention, and FIG. 13 is a partial perspective view showing the side plates of the first engine-mounting metal member 83 shown in FIG. 12. The first engine-mounting metal member 83 comprises a bottom plate 90, a pair of first side plates 86, 86 vertically extending from one side of the bottom plate 90 substantially on both lateral sides, and a pair of second side plates 92, 92 extending from the other side of the bottom plate 90 for supporting the engine. In this embodiment, the second side plates 92, 92 are integrally connected at their one ends as shown in FIG. 12. Each of the first side plates 86, 86 is provided with a tapered dent 87, 87 which is shaped complementarily to the tapered recess 4 of the sandwich structure shown in FIG. 1. Incidentally, since a space between these tapered dents 87, 87 receives the bottom wall 4b constituted by bonded skin layers 1, 1 shown in FIG. 1, its gap is equal to or lightly larger than the thickness of the bottom wall 4b. Opposing portions 88, 88 of the tapered dents 87, 87 are also provided with a plurality of holes 89 for bolts at positions corresponding to the holes 5.

In this embodiment, the bottom plate 90 of the first metal member 83 may also be provided with a pair of third side plates 93, 93 extending therefrom on the same side as the second side plates 92, 92 for mounting an upper arm. In this embodiment, the third side plates 93, 93 are integrally connected at their one ends as shown in FIG. 12. Each side plate 93 is provided with a hole 85 for mounting the upper arm.

An edge portion of the bottom plate 90 is bent upwardly for reinforcement. The second and third side plates are also provided with bent portions in their edges for reinforcement.

Incidentally, since the direction of supporting the engine and the direction of supporting the upper arm are different, the bottom plate 90 of the first engine-mounting metal member 83 is bent in compliance with the difference in the above supporting direction.

Figure 14:
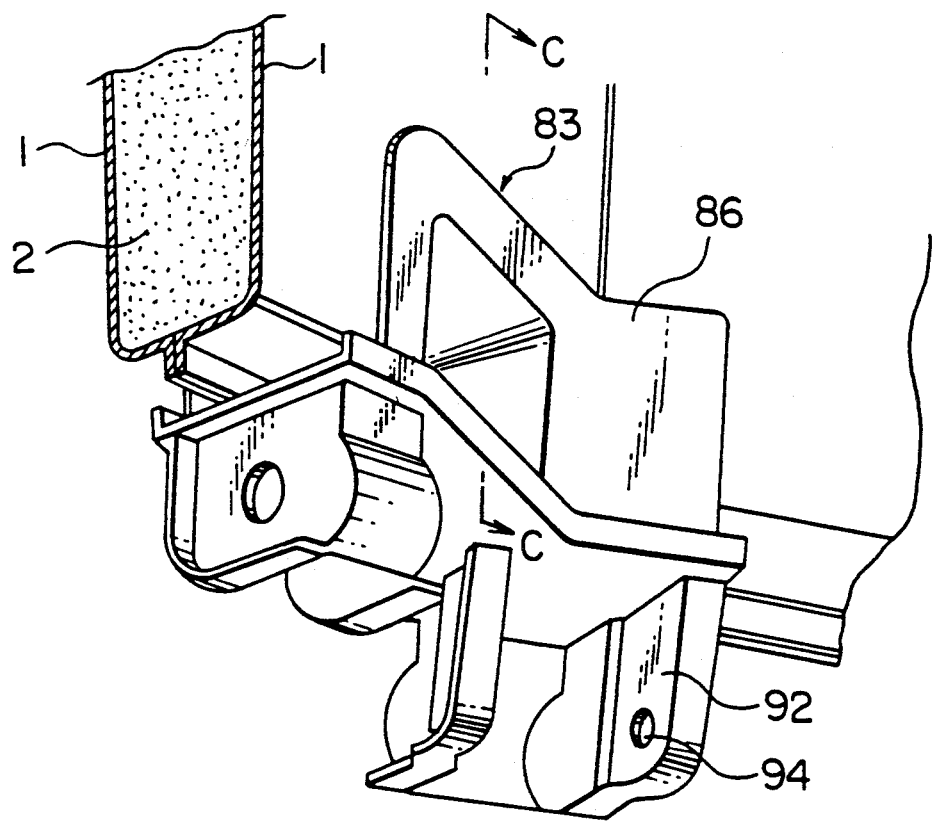
FIG. 14 is a partially cut perspective view showing the first engine-mounting metal member shown in FIG. 12 fixed to the first engine-mounting portion shown in FIG. 11.
Figure 15:
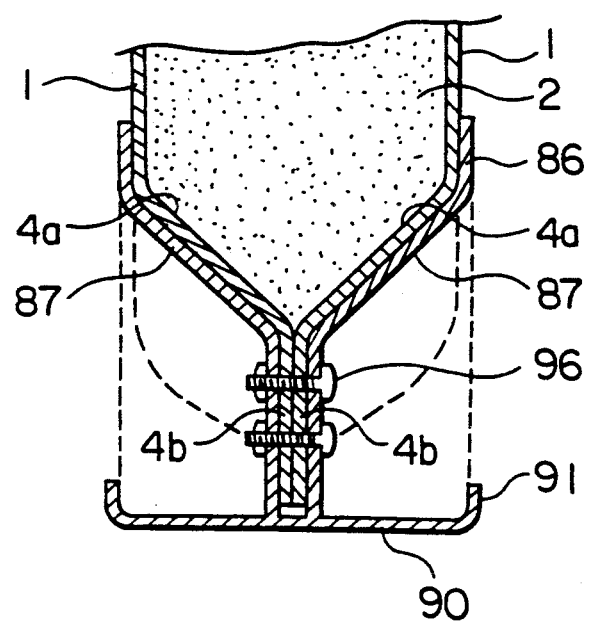
FIG. 15 is a cross-sectional view taken along the line C—C in FIG. 14.

FIG. 14 is a partially cut perspective view showing the first engine-mounting metal member 83 of FIG. 12 fixedly mounted to the first engine-mounting portion having the same shape as the part-mounting portion 6 of the sandwich structure shown in FIG. 1, and FIG. 15 is a C—C cross-sectional view showing the first engine-mounting structure shown in FIG. 14.

As is clear from FIG. 15, the tapered recesses 4, 4 of both skin layers 1, 1 of the sandwich structure are in complete contact with the tapered dents 87, 87 of the first engine-mounting metal member 83 in entire surfaces 4a, 4b. In this state, the tapered recesses 4, 4 and the tapered dents 87, 87 are fixedly bonded together by an adhesive. As shown in FIG. 15, since the holes 89 of the tapered dents 87, 87 of the side plates 86, 86 are aligned with the holes 5 of the bottom wall 4b of the tapered recesses 4, 4, they are fixed by bolts 86 extending therethrough.

The engine is mounted to the first metal member 83 by inserting its ends into the holes 94, 94 of the second side plates 92, 92.

A load of the engine is uniformly transmitted via both first side plates 86, 86 of the first engine-mounting metal member 83 to the tapered recesses 4, 4 of the two skin layers 1, 1 to which the first engine-mounting metal member 83 is fixed. Since the tapered recesses 4, 4 are fixed to the complementarily tapered dents 87, 87, a load of any direction can always be sustained by some portion of the first engine-mounting structure having enough strength.

Specifically speaking, when an upward load is applied, the load is sustained by the upper, conical side wall portions of the tapered recesses 4, 4. On the other hand, when a downward load is applied, the load is sustained by the surfaces 1a shown in FIG. 1 and 86a shown in FIG. 13. In general, a shear strength of adhesion is much larger than a peeling strength, the structure in which a load is sustained by this shearing strength is extremely advantageous in strength.

Further, when a lateral load is applied, both lateral side wall portions of the tapered recesses 4, 4 sustain the load sufficiently.

In addition, when a torsional load is applied, the torsional load can be sustained by the overall surfaces of the adhered walls of the tapered recesses 4, 4, because both overall tapered surfaces of the sandwich structure and the first engine-mounting metal member are fixed by adhesion. Moreover, since the tapered dents 87, 87 are fixed on both surfaces, a torsional load of any direction is transmitted as a pressing force to the tapered recesses in some portions on both surfaces. In other words, a force of peeling direction in a portion is inevitably a force in a pressing direction in another portion. Accordingly, the torsional load is sufficiently sustained by some of those portions. This means that a torsional load is not applied only as a peeling force to the bonded boundaries between the tapered recesses 4, 4 and the tapered dents 87, 87.

As described above, a load exerted from the engine is fully sustained by the bonded portions between the tapered recesses 4, 4 of the skin layers 1, 1 and the tapered dents 87, 87 of the first engine-mounting metal member 83 and between the portions 1a in FIG. 1 and the portion 86a in FIG. 13. However, for the purposes of reinforcement and fail-safe, the first engine-mounting metal member is fixed to the first engine-mounting portion 78 of the sandwich structure by bolts 96, so that the first engine-mounting metal member is not detached even when the adhesion is broken.

Bent fringe portion 91 of the bottom plate 90 of the first engine-mounting metal member 83 is for reinforcement of the bottom plate 90.

The first engine-mounting structure according to the fourth embodiment of the present invention has been explained referring to the attached drawings, but the present invention is not restricted thereto, and any modifications can be made unless they deviate from the scope of the present invention as described above. Incidentally, the first engine-mounting metal member 83 shown in FIG. 12 has a pair of third side plates for mounting an upper arm, but the third side plates 93, 93 are not indispensable.

As described above in detail, the first engine-mounting structure according to the fourth embodiment of the present invention can serve to uniformly transmit a load of the engine to the overall surfaces of the sandwich structure.

Figure 16:
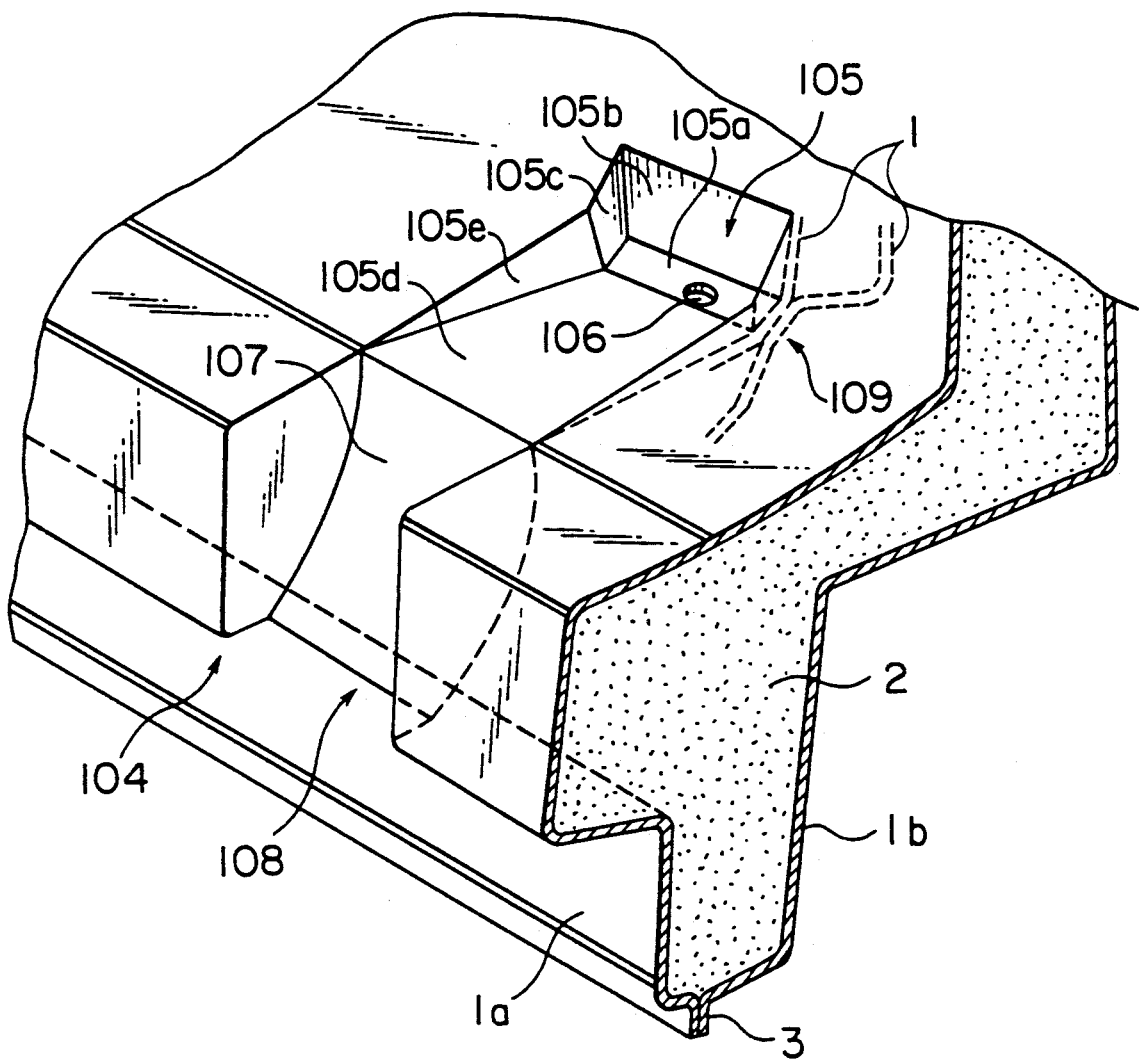
FIG. 16 is a partially cut perspective view showing the second engine-mounting portion of a vehicle body of a sandwich structure according to the fifth embodiment of the present invention.
Figure 17:
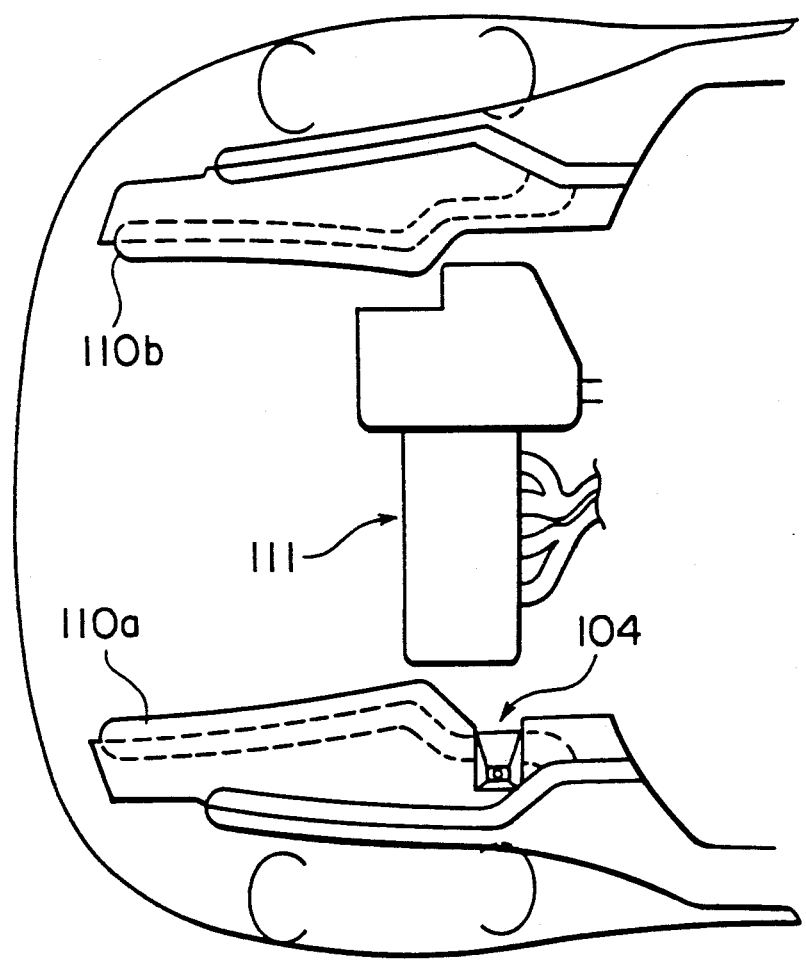
FIG. 17 is a partial schematic view showing the positions of the second engine-mounting portions in the vehicle body of a sandwich structure shown in FIG. 16.

FIG. 16 is a partial perspective view showing the second engine-mounting portion of a vehicle body of a sandwich structure according to the fifth embodiment of the present invention, and FIG. 17 is a schematic view showing the second engine-mounting portion of the vehicle body.

As is clear from FIG. 17, the second engine-mounting portion 104 shown in FIG. 16 is located on a front frame 110a (on the left side in this embodiment) of a sandwich structure at a position for supporting an engine 111 mounted laterally in a front portion of the vehicle body from the left.

The sandwich structure constituting this front frame is composed of a core layer 2 made of a foamed material and a pair of skin layers 1a, 1b formed on both surfaces of the core layer 2. In an edge portion of the sandwich structure, both skin layers 1a, 1b are bonded together to form a flange portion 3.

In the second engine-mounting portion 104 of this sandwich structure, a front skin layer 1a (on the engine side) is provided with a first tapered recess 105 and a projected portion 108 serving as an engaging portion for a second engine-mounting metal member. The first tapered recess 105 comprises a flat bottom wall 105a and sloped side walls 105b, 105c, 105d and 105e surrounding the bottom wall 105a. A rear skin layer 1b is provided with a second tapered recess 109 on the back side of the first tapered recess 105. In the bottom wall 105a, both skin layers 1a, 1b are bonded together. Incidentally, the bottom wall 105a is provided with one or more holes 106 for receiving bolts for mounting a second engine-mounting metal member.

Disposed below the first tapered recess 105 is a projected portion 108 having an engaging portion engageable with a second engine-mounting metal member at its lower end. The projected portion 108 and the first tapered recess 105 are connected via a concavely curved surface 107.

Figure 18:
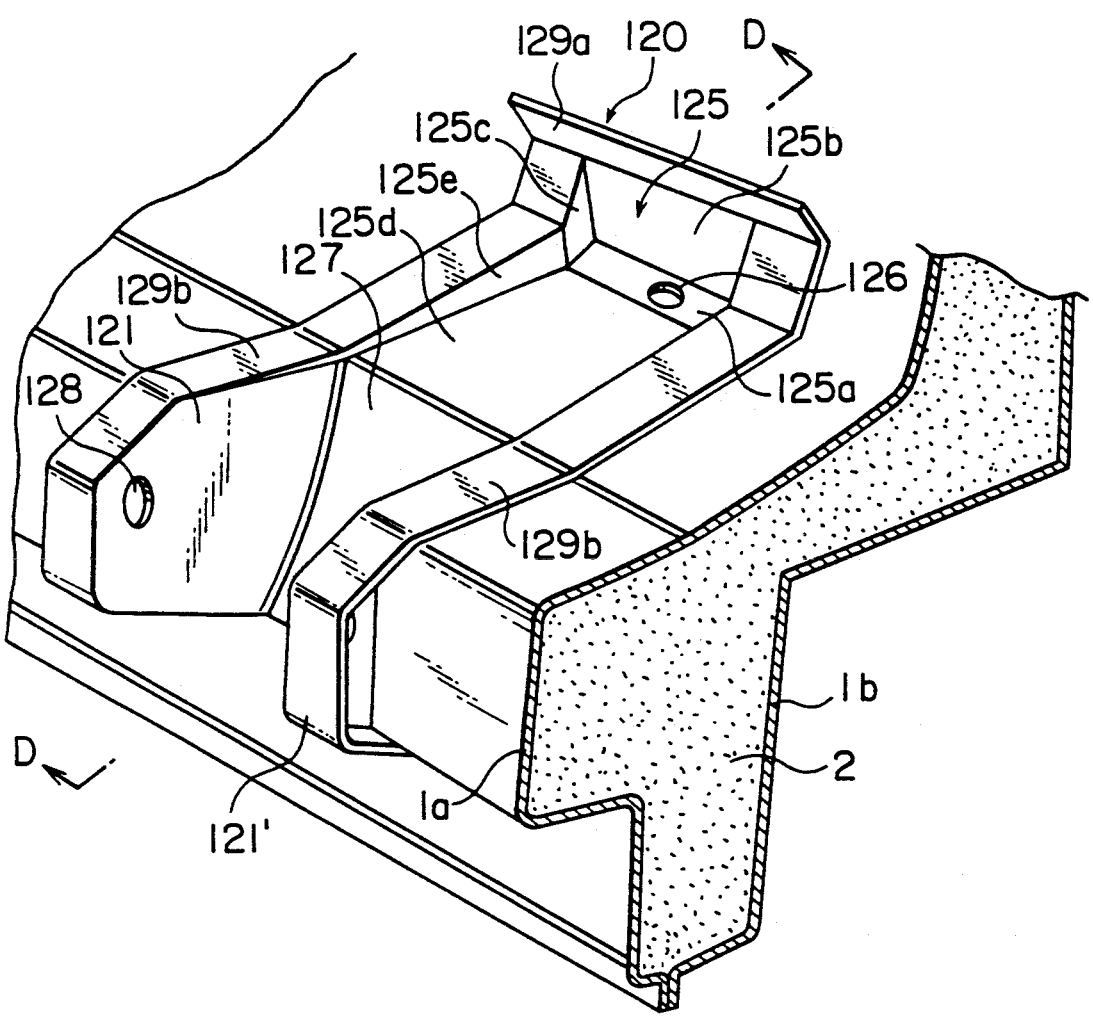
FIG. 18 is a partially cut perspective view showing the second engine-mounting metal member fixedly mounted to the second engine-mounting portion of FIG. 16.
Figure 19:
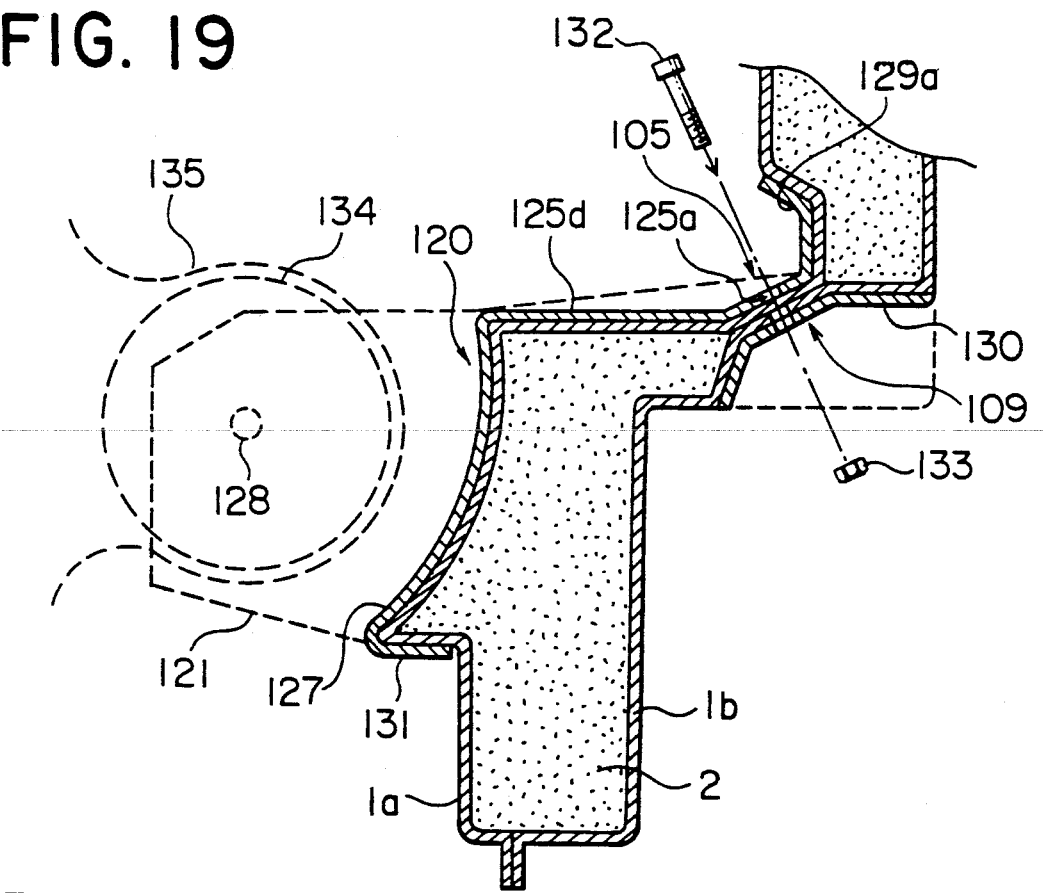
FIG. 19 is a cross-sectional view taken along the line D—D in FIG. 18.

FIG. 18 is a partially cut perspective view showing the second engine-mounting metal member mounted to the second engine-mounting portion shown in FIG. 16, and FIG. 19 is a D—D cross-sectional view of FIG. 18.

The second metal member mounted to the second engine-mounting portion 104 is constituted by a first piece 120 for integrally covering the first tapered recess 105 and the projected portion 108 on the engine side, and a second metal piece 130 for covering the second tapered recess 109 on the back side. In FIG. 18, only the first metal piece 120 of the second engine-mounting metal member on the engine side is shown. The first metal piece 120 comprises a tapered dent 125 constituted by a flat bottom plate 125a and sloped side walls 125b, 125c, 125d and 125e surrounding the bottom plate 125a. This tapered dent 125 has a shape complementary to the first tapered recess 105 shown in FIG. 16. The bottom plate 125a is provided with a hole 126 for a bolt at a position corresponding to the bolt hole 106 of the bottom wall 105a of the first tapered recess 105.

As is clear from FIG. 19, the first metal piece 120 has a bent portion 131 at its lower end, which engages the projected portion 108 of the second engine-mounting portion 104.

The first metal piece 120 further comprises a pair of side plates 121, 121' extending from both lateral sides of the concavely curved surface portion 107 for supporting an engine. Each side plate 121, 121' is provided with a hole 128 for receiving an end portion 135 of the engine. These side plates 121, 121' and the tapered dent 125 are provided in their edge portions with continuous flange portions 129a and 129b.

On the other hand, to the second tapered recess 109 formed on the rear skin layer 1b on the back side is mounted the second metal piece 130 having a complementary shape to the second tapered recess 109. The first metal piece 120 and the second metal piece 130 are fixed by a bolt 132 and a nut 133 sandwiching both skin layers 1a, 1b.

As is clear from FIG. 19, the first metal piece 120 is in close contact with the front skin layer 1a of the sandwich structure in the overall surfaces of the flange portion 129a, the tapered dent 125, the concave portion 127 and the bent portion 131. Further, as shown in FIG. 18, the flange portions 129b, 129b are in close contact with the skin layer 1a. In this state, the first metal piece 120 is strongly bonded to the vehicle body of the sandwich structure by an adhesive.

An end 135 of the engine block is supported by the holes 128, 128 of the side plates 121, 121' via rubber discs 134, 134 as shown in FIG. 19.

A load applied to the engine is smoothly transmitted via the first metal piece 120 to the skin layer 1a to which the first metal piece 120 is fixed. Since the first metal piece 120 is fixed to the first tapered recess 105, the projected portion 108 and the concavely curved surface 107 of the vehicle body, a load of any direction can always be sustained by some portions of the second engine-mounting structure having enough strength.

Specifically speaking, a downward load of the engine is sustained by the concavely curved portion 127 and the flanged portions 129a, 129b of the first metal piece 120, and an upward load exerted by the vibrations of the engine and the vehicle body is sustained by the bent portion 131. Further, the load can be sustained by the bonded surfaces of the side walls 105b, 105c, 105d, 105e of the first tapered recess 105 and the side plates 121, 121'.

Further, when a lateral load or a torsional load is applied, the side walls 105b, 105c, 105d, 105e surrounding the bottom wall 105a, a pair of the side plates 121, 121' and the flange portions 129b, 129b can sustain the load sufficiently. The bent portion 131 is also effective to a torsional load.

As described above, a load exerted from the engine is fully sustained by the bonded portions between the second engine-mounting portion 104 and the first metal piece 120. However, for the purposes of reinforcement and fail-safe, the second engine-mounting metal member is further fixed to the second engine-mounting portion of the sandwich structure by one or more bolts 132, so that the second engine-mounting metal member is not detached even when the adhesion is broken. In this case, since the second tapered recess 109 is covered by the second metal piece 130 mounted thereto, a force generated by threading is uniformly transmitted by the overall surface of the second metal piece 130 to the sandwich structure as a pressing force. Accordingly, the second engine-mounting structure of the present invention is extremely strong.

The second engine-mounting structure according to the fifth embodiment of the present invention has been explained referring to the attached drawings, but the present invention is not restricted thereto, and any modifications can be made unless they deviate from the scope of the present invention as described above.

As described above in detail, the second engine-mounting structure according to the fifth embodiment of the present invention can serve to smoothly transmit a load of the engine to the overall surfaces of the sandwich structure.

Figure 20:
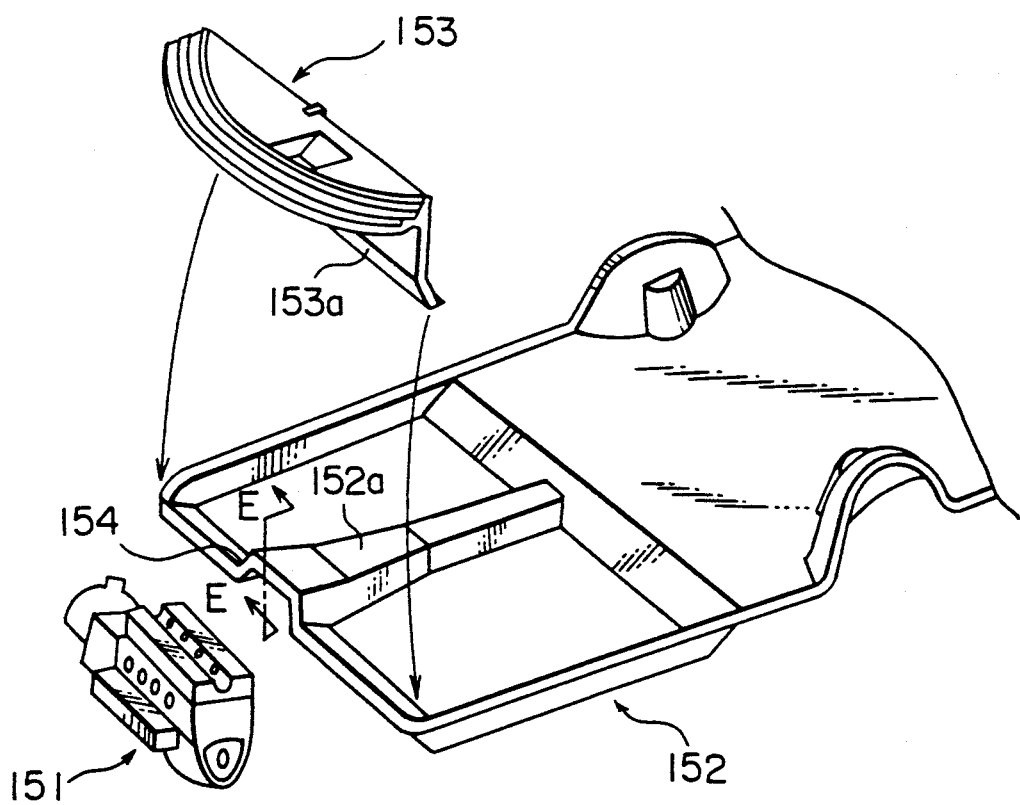
FIG. 20 is an exploded partial perspective view showing the mounting position of the third engine-mounting portion in a vehicle body of a sandwich structure according to the sixth embodiment of the present invention.

FIG. 20 is an exploded partial perspective view showing the position of the third engine-mounting portion in the vehicle body constituted by a sandwich structure according to the sixth embodiment of the present invention. A rear end of the engine 151 laterally disposed in a front portion of the vehicle body is fixed to the vehicle body at a position 154 near a portion in which the floor panel 152 and a vertical wall 153a of the dashboard 153 are fixed together.

Figure 21:
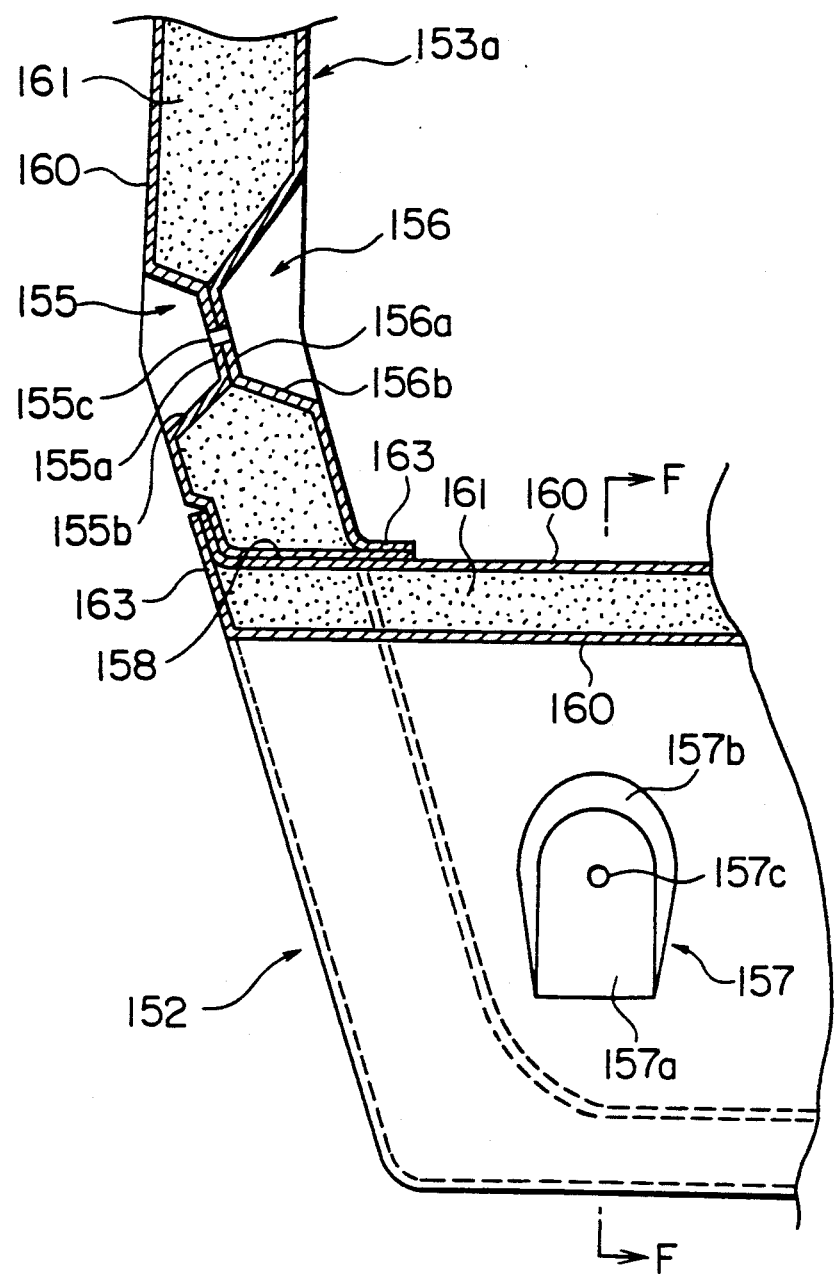
FIG. 21 is an E—E cross-sectional view of FIG. 20 showing the third engine-mounting portion of the vehicle body of a sandwich structure.

FIG. 21 is an E—E cross-sectional view showing the third engine-mounting portion of the vehicle body according to one embodiment of the present invention in which the floor panel 152 and the dashboard 153 are bonded together. Each of the floor panel 152 and the vertical wall 153a of the dashboard 153 is constituted by a core layer 161 made of a foamed material and a pair of skin layers 160, 160 formed on both surfaces of the core layer 161. In an edge portion of the sandwich structure, both skin layers 160, 160 are bonded together to form a flange portion 163. In a lower end surface 158 of the vertical wall 153a of the dashboard 153, the dashboard 153 is fixedly bonded to the floor panel 152.

In the vertical wall 153a of the dashboard 153, the skin layer 160 on the engine side is provided with a tapered recess 155. The tapered recess 155 comprises a flat bottom wall 155a and a sloped side wall 155b surrounding the bottom wall 155a. The vertical wall 153a is also provided with a tapered recess 156 on the opposite side to the tapered recess 155. The tapered recess 156 is also constituted by a flat bottom wall 156a and a sloped side wall 156b surrounding the bottom wall 156a. The bottom walls 155a and 156a are directly bonded together without interposing the core layer 161. Incidentally, the bottom walls 155a, 156a are provided in their bonded area with one or more holes 155c for receiving bolts for mounting third engine-mounting metal pieces.

The floor panel 152 is provided with a second tapered recess 157 at a position corresponding to an inner wall of a shaft tunnel (152a in FIG. 20) formed by the floor panel 152. This tapered recess 157 is also constituted by a flat bottom wall 157a having a bolt hole 157c, and a sloped side wall 157b. The tapered recess 157 is opened substantially perpendicular to the tapered recess 155.

Figure 22:
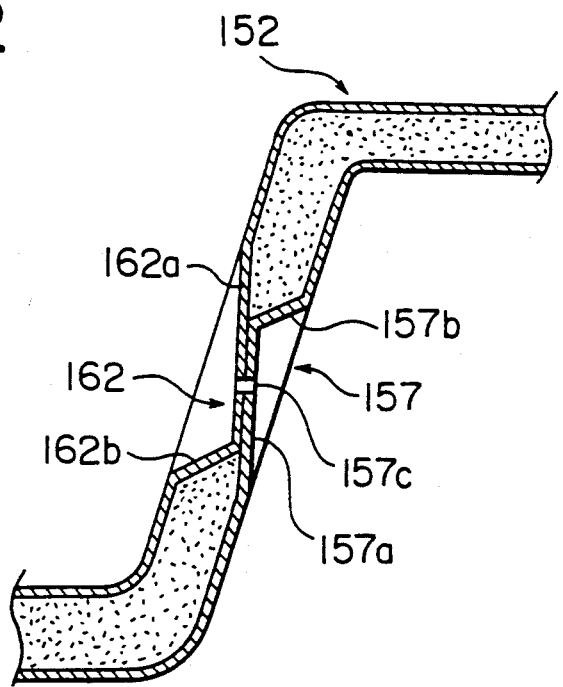
FIG. 22 is an F—F cross-sectional view of FIG. 21.

FIG. 22 is an F—F cross-sectional view of FIG. 21. As is clear from FIG. 22, another tapered recess 162 is formed on the back side of the floor panel 152 at a position corresponding to the tapered recess 157. The tapered recess 162 is also constituted by a flat bottom wall 162a and a sloped side wall 162b. Both flat bottom walls 157a and 162a are fixedly bonded together, and they have one or more holes 157c for bolts in their bonded area.

Figure 23:
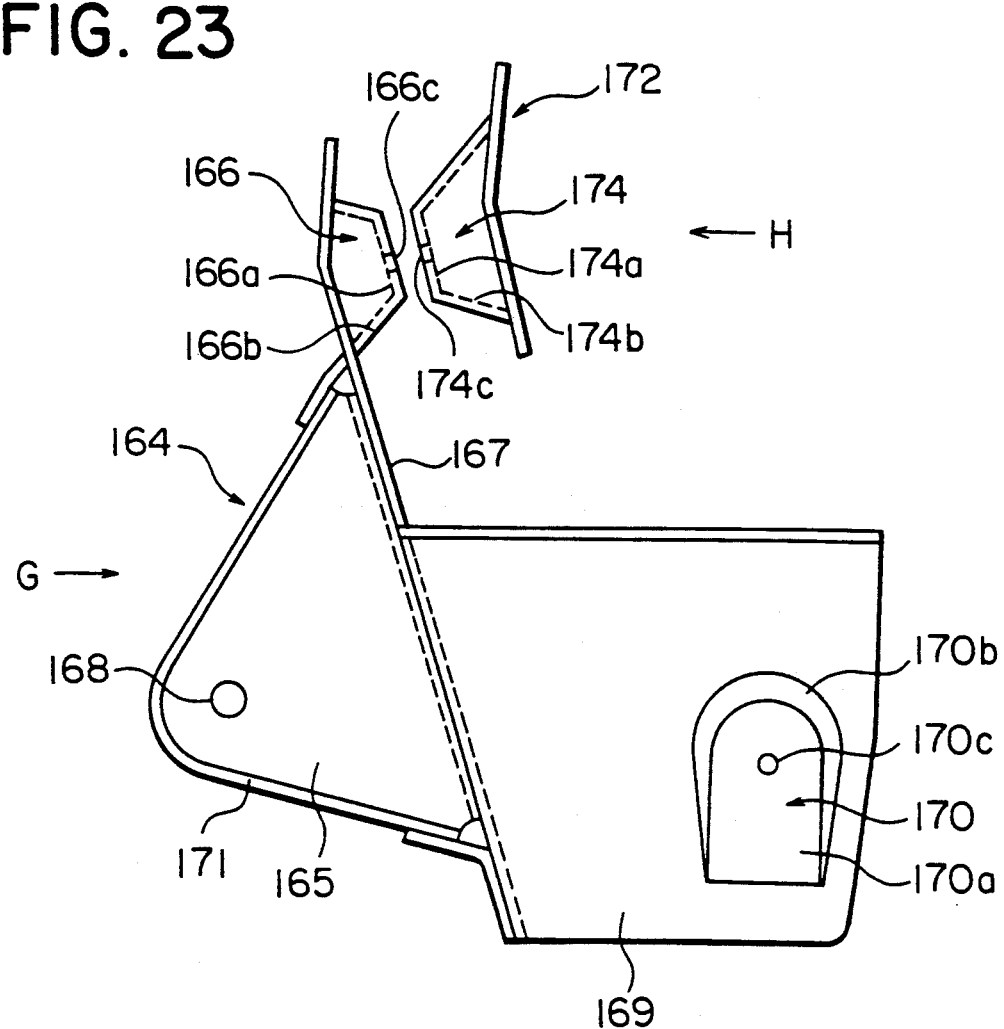
FIG. 23 is a side view showing the first and second metal pieces to be bonded to the third engine-mounting portion shown in FIG. 21.
Figure 24:
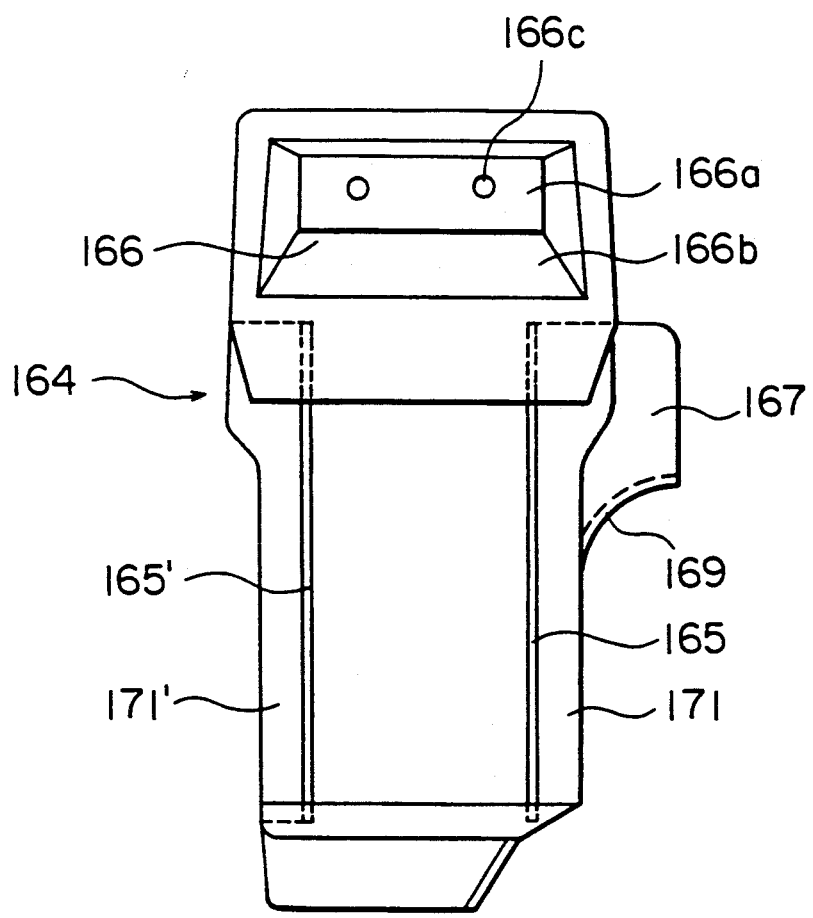
FIGS. 24 and 25 are side views of the metal members when viewed in the directions G, H, respectively in FIG. 23.
Figure 25:
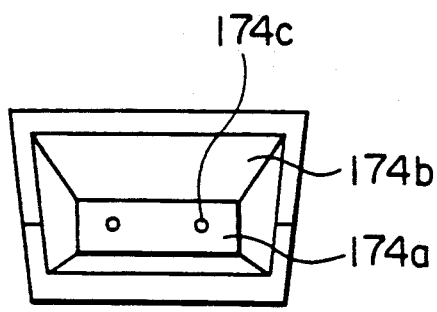

FIG. 23 is a side view showing a first metal piece 164 and a second metal piece 172 for mounting the engine to the third engine-mounting portion shown in FIG. 21, and FIGS. 24 and 25 are side views showing the first metal piece 164 viewed from G and the second metal piece 172 viewed from H in FIG. 23.

The first metal piece 164 fixed to the vehicle body on the engine side comprises a bottom plate 167, a tapered dent 166 having a shape covering the tapered recess 155 shown in FIG. 21, a first side plate 169 extending backward from the bottom plate 167 below the tapered dent 166 and having a tapered dent 170 having a shape covering the tapered recess 157 disposed in a lower portion of the third engine-mounting portion, and a pair of second side plates 165, 165' extending forward from the bottom plate 167 for supporting the engine. The tapered dent 166 of the first metal piece 164 is shaped complementarily to the tapered recess 155 and has a flat wall 166a and a sloped side wall 166b. The bottom wall 166a has a hole 166c for a bolt at a position corresponding to the hole 165c of the bottom wall 165a of the tapered recess 165.

Below the tapered dent 166, the bottom plate 167 of the first metal piece 164 is provided with a pair of side plates 165, 165' extending therefrom on the engine side for mounting the engine. Each second side plate 165, 165' is provided with a hole 168 for mounting a bolt for supporting an end of the engine. The second side plates 165, 165' are also provided with bent fringe portions 171, 171' for reinforcement.

A first side plate 169 integrally extends from the bottom plate 167 on the opposite side to the second side plates 165, 165'. This first side plate 169 is provided with a tapered dent 170 having a flat bottom wall 170a and a sloped side wall 170b. The tapered dent 170 is in a shape covering the tapered recess 157 shown in FIG. 21 without any gap therebetween. The bottom wall 170a is provided with a hole 170c for a bolt at a position corresponding to the bolt hole 157c of the flat bottom wall 157a of the tapered recess 157 shown in FIG. 21.

On the other hand, the second metal piece 172 has a tapered dent 174 in a shape covering the tapered recess 156 shown in FIG. 21 without any gap. The tapered dent 174 has a flat bottom wall 174a and a sloped side wall 174b. The flat bottom wall 174a is provided with a hole 174c for a bolt at a position corresponding to the bolt hole 155c of the tapered recess 156 shown in FIG. 21.

Figure 26:
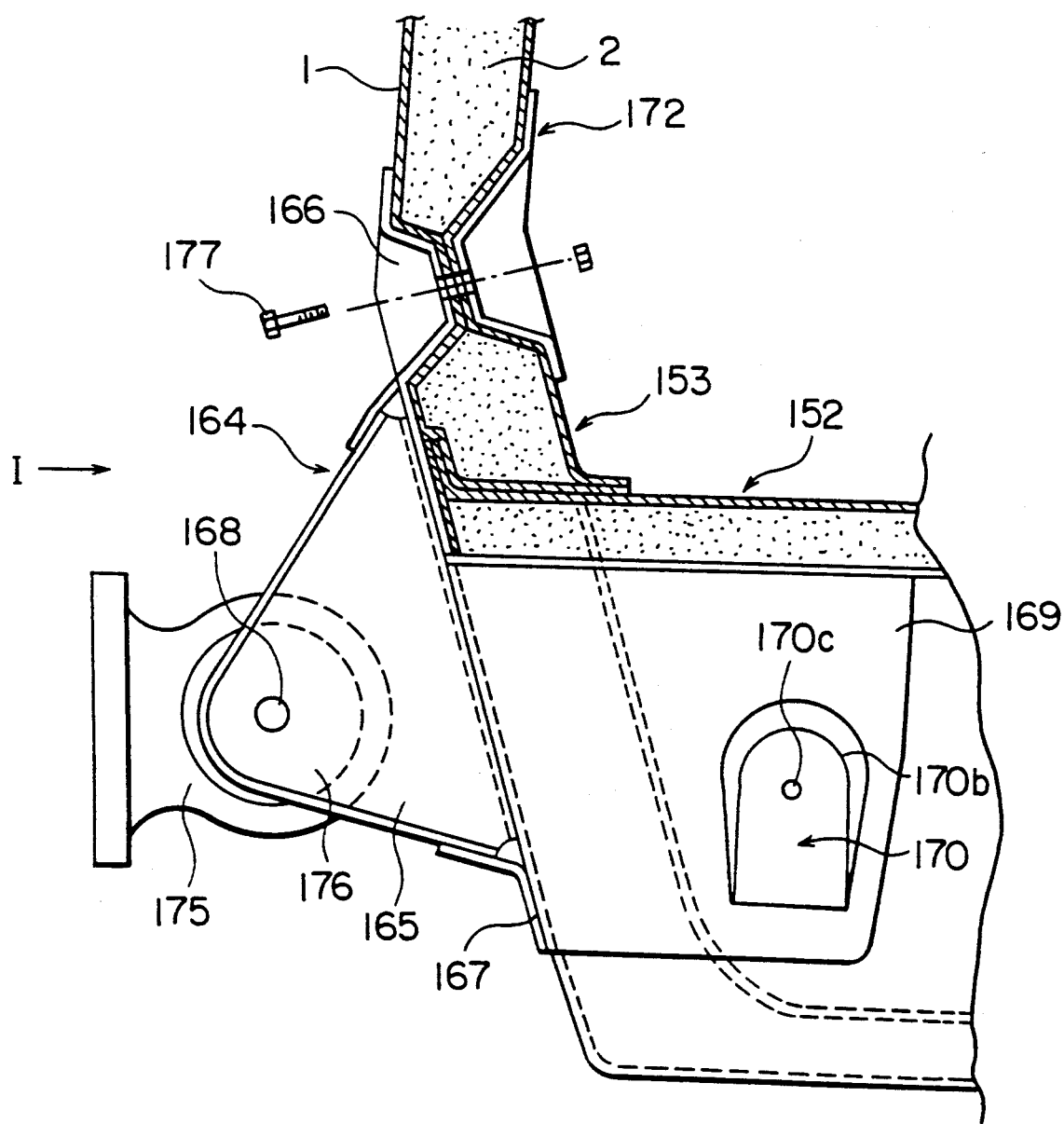
FIG. 26 is a partially cut side view showing the third engine-mounting metal member fixed to the third-engine-mounting portion shown in FIG. 21.
Figure 27:
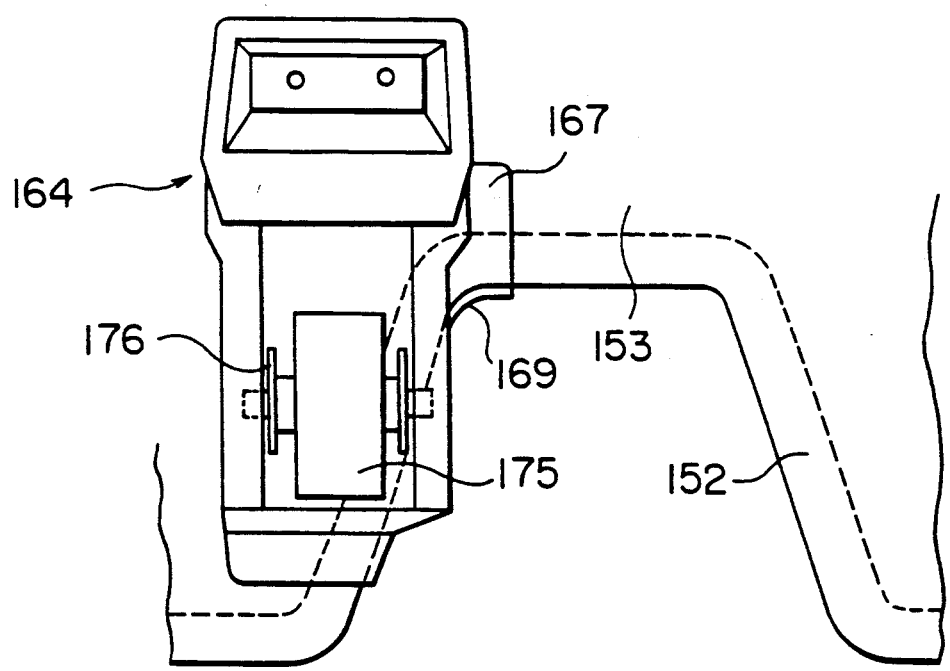
FIG. 27 is a schematic partial side view of the third engine-mounting structure of FIG. 26 when viewed in the direction I.

FIG. 26 is a partially cut side view showing the third engine-mounting member fixed to the third engine-mounting portion shown in FIG. 21, and FIG. 27 is a partial schematic view showing the third engine-mounting structure viewed from I.

The first metal piece 164 is fixedly mounted to the vehicle body with its tapered dent 166, bottom plate 167 and first side plate 169 bonded to the skin layer of the sandwich structure without any gap. The first metal piece 164 and the second metal piece 172 are fixed together by a bolt 177 at a position of the tapered dent 166. In the tapered dent 170 formed in the first side plate 169, the first metal plate and the third metal piece (not shown) are fixed together by a bolt (not shown). The third metal piece has a shape covering the tapered recess 162 shown in FIG. 22 without any gap. In this state, the first, second and third engine-mounting metal pieces of the third engine-mounting metal member are strongly bonded to the vehicle body of the sandwich structure by an adhesive.

The engine is mounted to the first metal piece 164 of the third engine-mounting-metal member by inserting its end portions into the holes 168, 168 of the second side plates 165, 165 via rubber discs 176, 176.

A load of the engine is uniformly transmitted via both second side plates 165, 165 of the first metal piece 164 to the skin layer 160 to which the first metal piece 164 is fixed. Since the first metal piece 164 is fixedly mounted to the vehicle body with its tapered dent 166 fixedly inserted into the tapered recess 156 and its bottom plate 167 and side plate 169 fixedly bonded to the skin layer of the vehicle body, a load of any direction can always be sustained by some portions of the third engine-mounting structure having enough strength.

Specifically speaking, when an upward load is applied by the vibrations of the engine, the load is sustained by the bottom wall 155a and the side wall 155b of the tapered recess 155, and the skin layer 160 bonded to the bottom plate 167, and the side plate 169 and the tapered dent 170. On the other hand, when a downward load is applied, the load is sustained by the skin layer 160 adhered to the bottom plate 167 and the side wall of the tapered recess 155 adhered to the side wall of the corresponding tapered dent 166 (shearing direction) and the bolt 177 fastening this tapered dent 166. In addition, the adhered surfaces of the side plate 169 (shearing direction) and the tapered dent 170 also sustain the load. Accordingly, the downward load of the engine is sufficiently sustained. In general, a shear strength of adhesion is much larger than a peeling strength, the structure in which a load is sustained by this shearing strength is extremely advantageous in strength.

Further, when a lateral load or a torsional load is applied, the load can be sustained as a pressing force by some of the tapered recesses 155, 157 fixed to the tapered dents, and the skin layer adhered to the bottom plate 167 and the side plate 169.

Incidentally, at the upper and lower tapered recesses 155, 157, the fastening forces by the bolts are uniformly transmitted to the skin layers of the sandwich structure as pressing forces by the first, second and third metal pieces. Accordingly, there is no concentration of a stress in the sandwich structure.

Figure 28:
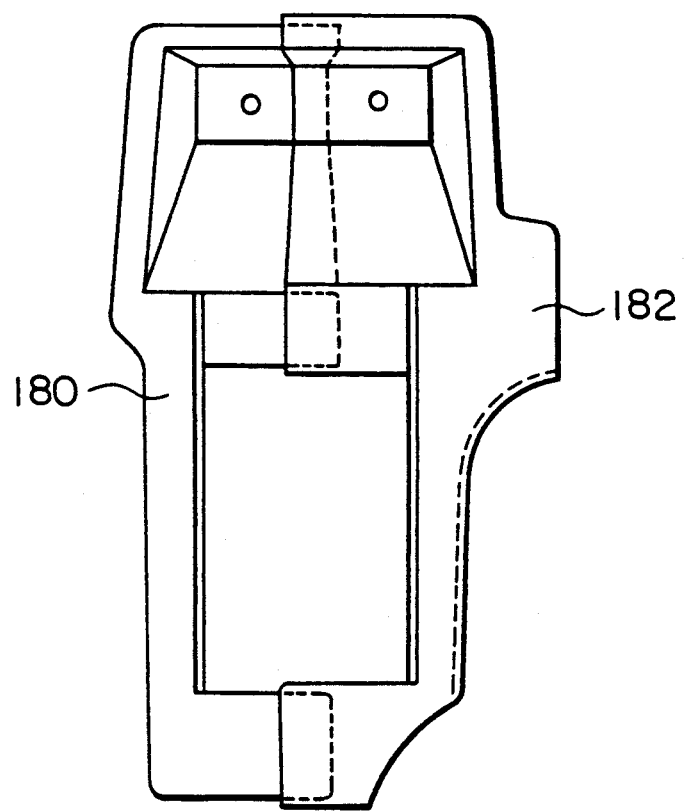
FIG. 28 is a side view showing another example of a first metal piece for mounting an engine.

The third engine-mounting structure according to the sixth embodiment of the present invention has been explained referring to the attached drawings, but in the present invention is not restricted thereto, and any modifications can be made unless they deviate from the scope of the present invention. For instance, instead of using an integral first metal piece shown in FIGS. 23 and 24, two metal plates 180, 182 can be combined as shown in FIG. 28 to serve as a metal piece having side plates for supporting the engine and two tapered dents. In this case, overlapped portions of the two metal plates can be welded. Also, instead of providing a pair of tapered recesses symmetrically to the skin layers, only one skin layer can be provided with a tapered recess while another skin layer is kept flat. Further, the metal pieces may be fastened by rivets instead of bolts.

As described above in detail, the third engine-mounting structure according to the sixth embodiment of the present invention can serve to uniformly transmit a load of the engine to the overall surfaces of the sandwich structure.

Figure 29:
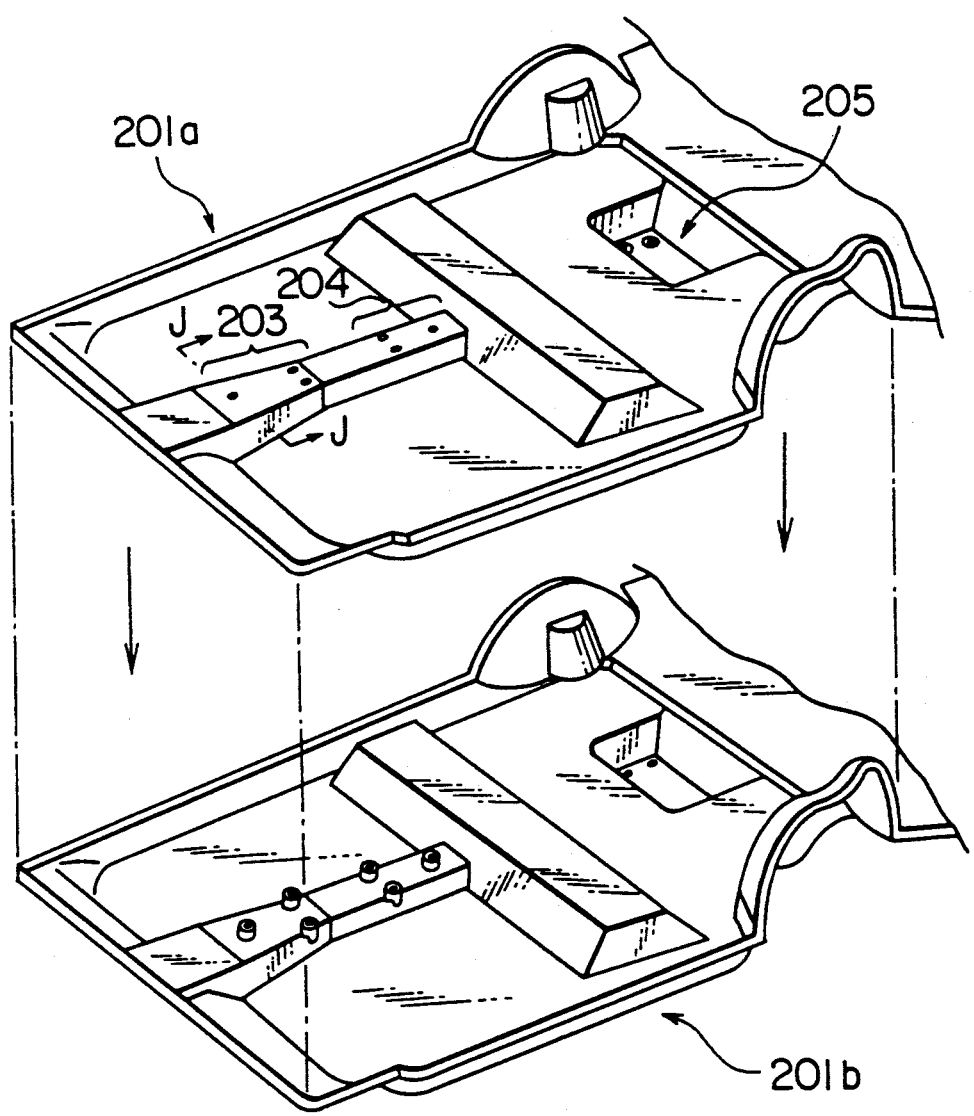
FIG. 29 is an exploded partial perspective view showing the part-mounting portion of a floor panel constituted by a sandwich structure according to the seventh embodiment of the present invention.

FIG. 29 is an exploded partial perspective view showing a part of a floor panel of a vehicle body having part-mounting portions according to the seventh embodiment of the present invention. The floor panel is constituted by a sandwich structure constituted by a core layer (not shown) made of a foamed material, an upper skin layer 201a and a lower skin layer 201b formed on both surfaces of the core layer. The upper and lower skin layers 201a, 201b are bonded together along the entire periphery of the floor panel.

In FIG. 29, a front portion of the floor panel is on the left side, and this floor panel is provided with a gear change lever ASSY, a side brake lever and a rear suspension beam. The mounting portion of these parts are shown by reference numerals 203, 204 and 205 in FIG. 29, and in each mounting portion a plurality of holes for mounting the parts are provided.

Figure 30:
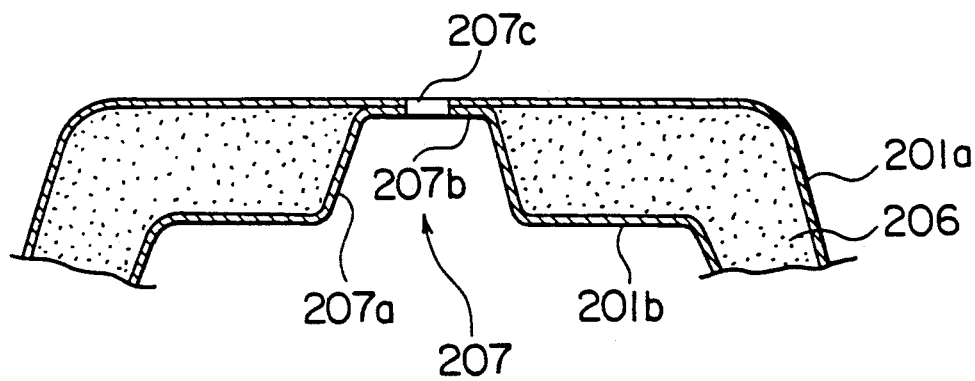
FIG. 30 is a cross-sectional view taken along the line J—J in FIG. 29.

FIG. 30 is a partial cross-sectional view taken along the line J—J in FIG. 29 showing the floor panel of the sandwich structure constituted by an upper skin layer 201a and a lower skin layer 201b and a core layer 206 (foamed material layer). A tapered recess 207 constituting a gear change lever ASSY mounting portion is formed on the side of the lower skin layer 201b. This tapered recess 207 is constituted by a sloped side wall 207a and a flat bottom wall 207b in which the upper and lower skin layers 201a, 201b are bonded together. This bottom wall 207b is provided with a hole 207c for a bolt for mounting the gear change lever ASSY.

Figure 31:
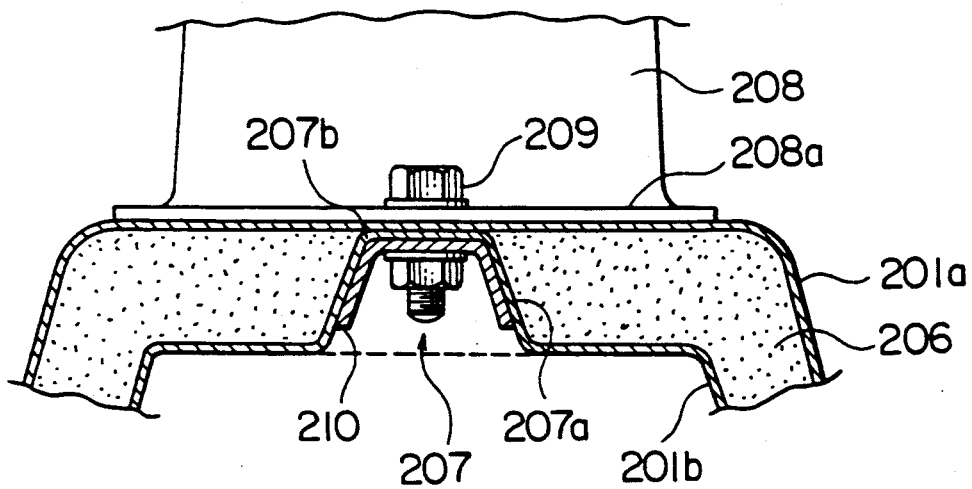
FIG. 31 is a partial cross-sectional view showing a part fixed to another example of the part-mounting portion via a metal member.

FIG. 31 is a partial cross-sectional view showing the mounting structure of the gear change lever ASSY 208 to the mounting portion shown in FIG. 30. The gear change lever ASSY 208 is fastened to the floor panel by a bolt 209 on its mounting surface. A metal member 210 is fitted into the tapered recess 207 such that the side wall 207a and the flat bottom wall 207b of the tapered recess 207 are covered by the metal member 210 without any gap, and the metal member 210 is fastened to the mounting portion by a bolt.

By this mounting structure, even though a load is applied to the gear change lever ASSY 208 in any direction, the load can be sustained by any one of the walls of the tapered recess 207 and the bolt.

Specifically speaking, in FIG. 31, when a vertical load is applied, the load is sustained by the bolt 209 and a nut threaded thereto and then uniformly transmitted via the metal member 210 to the overall contact surface of the skin layers. Accordingly, the concentration of a stress can be avoided, thereby preventing the breakage of the floor panel.

Also, when a lateral load is applied, it can be sustained by the side wall 207a of the tapered recess 207. Since the tapered recess 207a is in a frusto-conical shape, any lateral load can be sustained by some part of the side walls.

In addition, when a torsional load is applied, a torsional load of any direction is transmitted as a pressing force to some areas of the side wall 207a and the bottom wall 207b of the tapered recess. Accordingly, the detachment of the part can be effectively prevented.

Like the mounting structure of the gear change lever ASSY as described above, a side brake lever can also be mounted to the floor panel at a position 204 in FIG. 29 in the same manner.

Figure 32:
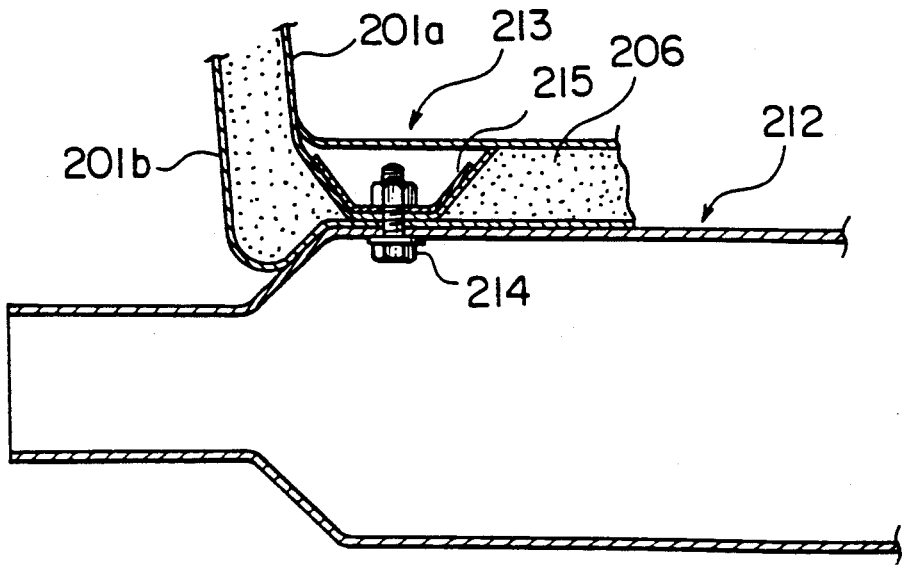
FIG. 32 is a partial cross-sectional view showing a further example of the mounting structure of a rear suspension beam.

In the above mounting structures of the gear change lever ASSY and the side brake lever, the tapered recess is formed on the lower skin layer of the floor panel. However, a tapered recess may be formed on the upper skin layer of the floor panel while keeping the lower skin layer flat, depending upon the types of the parts. FIG. 32 shows an example in which a rear suspension beam 212 is mounted to the sandwich structure. The rear suspension beam 212 is fixed to a lower surface of the floor panel by a bolt 214. In this case, the mounting structure is the same as in FIG. 31 except for the difference in the vertical position of the tapered recess.

As described above, in a part-mounting structure according to the seventh embodiment of the present invention, the metal members 210, 215 covering the tapered recesses are fitted into the tapered recesses without any gap, and to increase the mounting strength of parts, the metal members can be bonded to the skin layers by adhesives.

Since in this mounting structure the part is fastened by a bolt to the tapered recess of the part-mounting portion via the metal member, this mounting structure is extremely simple without necessitating a metal bracket of a complicated shape. In addition, since one end of the bolt is positioned in the tapered recess in the part-mounting portion, it does not interfere with other parts.

The part-mounting structure according to the seventh embodiment of the present invention has been explained referring to the attached drawings, but the present invention is not restricted thereto, and any modifications can be made unless they deviate from the scope of the present invention. For instance, the shape of the part-mounting portion is not restricted to a frusto-conical shape, and it may be a pyramidical shape. Parts which may be mounted to these part-mounting portions are not restricted to the above-mentioned gear change lever ASSY, side brake lever and rear suspension beam, and various parts such as an exhaust pipe, a fuel tank, seat belt anchors, etc. may be mounted.

As described above in detail, the part-mounting structure according to the seventh embodiment of the present invention enables it to mount a part to the floor panel of a sandwich structure without using a special bracket. Since this mounting portion of the sandwich structure is provided with a tapered recess, it is extremely strong to a load of any direction, including vertical, lateral and torsional directions. Such a part-mounting structure is particularly suitable for a floor panel which is a lower part of the vehicle body.

Figure 33:
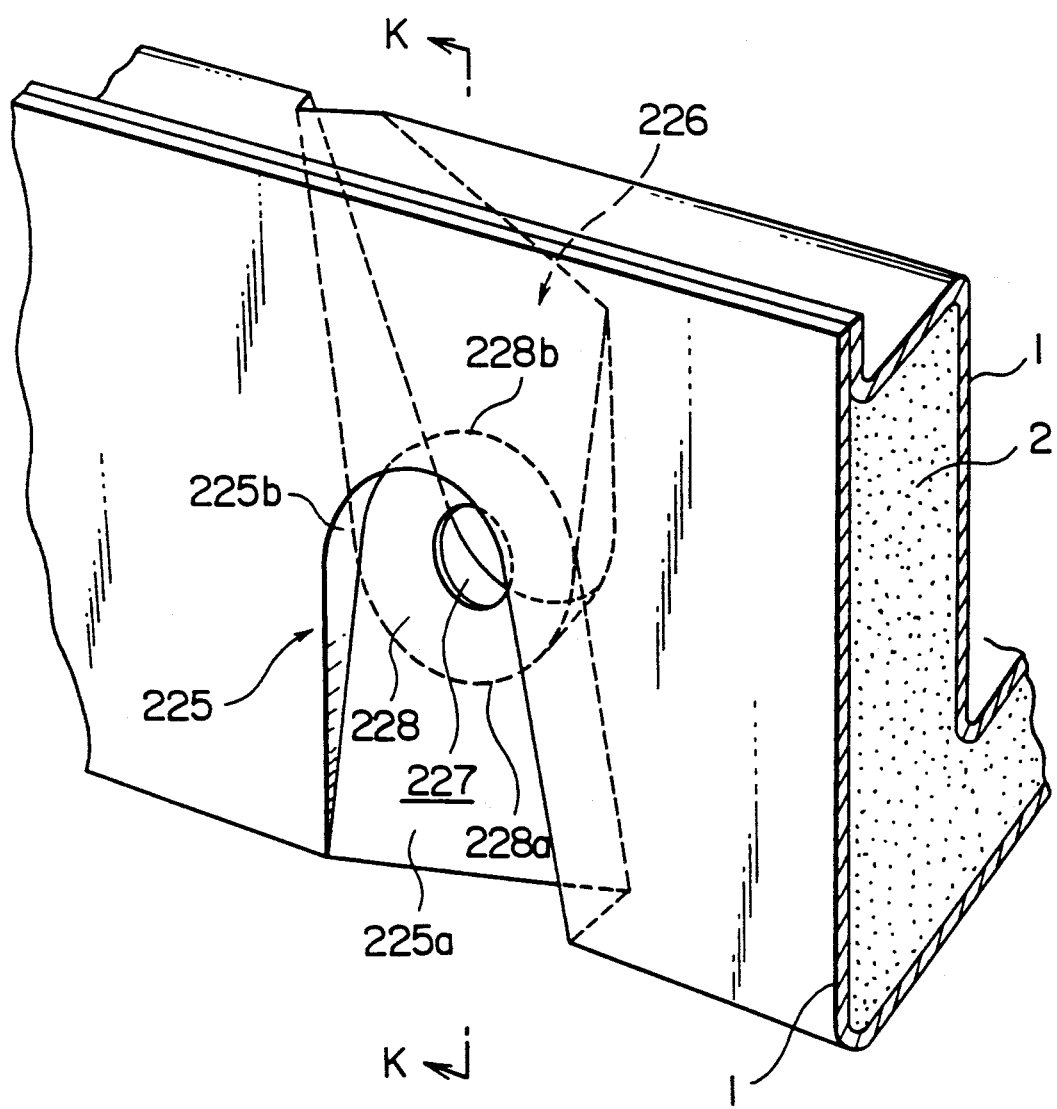
FIG. 33 is a partially cut cross-sectional view showing the part-mounting portion of a sandwich structure.
Figure 34:
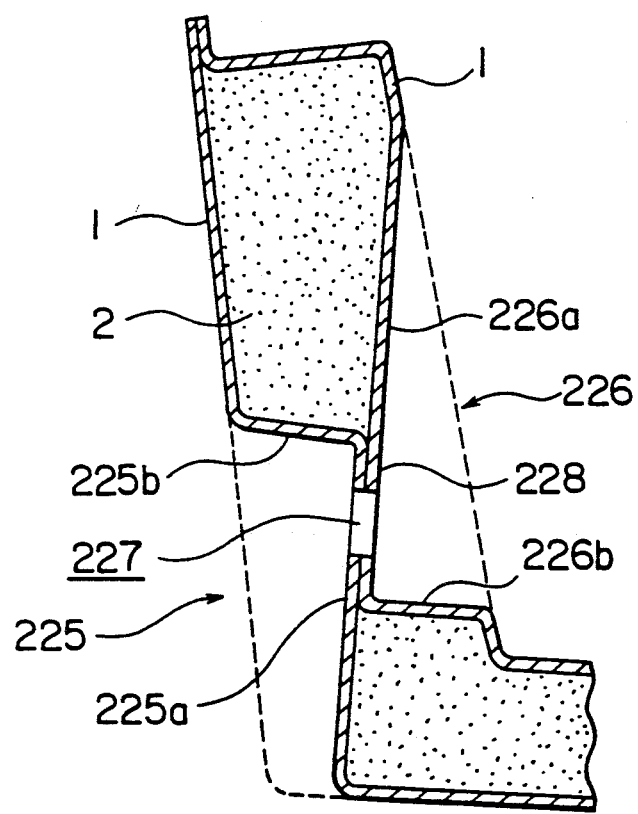
FIG. 34 is a cross-sectional view taken along the line K—K in FIG. 23.

FIG. 33 is a partial cross-sectional view showing the part-mounting portion of a sandwich structure according to the eighth embodiment of the present invention, and FIG. 34 is a K—K cross-sectional view of FIG. 33.

The part-mounting portion of this sandwich structure is provided with a recess 225 on one side and with a recess 226 on the other side. The recess 225 is constituted by a flat bottom wall 225a and a side wall 225b substantially perpendicular to the bottom wall 225a, and the recess 226 is similarly constituted by a flat bottom wall 226a and a side wall 226b substantially perpendicular to the bottom wall 226a. The bottom walls 225a and 226a are bonded together in an area 228 without interposing the core layer 2. This bottom wall-bonded portion 228 is provided at its center with a hole 227 for mounting a part.

In this embodiment, for formability of the skin layers, the side walls 225b, 226b of both recesses 225, 226 are not formed around the entire periphery of the area 228, in which both skin layers are bonded together. The side walls 225b, 226b are located at complementary positions, namely at symmetrical positions with respect to the hole 227. The skin layer-bonded area 228 is surrounded by at least one of the side walls. Specifically speaking, in FIG. 33, the side wall of the recess 226 is formed near the periphery 228a of the area 228, while the side wall 225b is formed near the periphery 228b of the areas 228, which is symmetrical to the periphery 228a with respect to the part-mounting hole 227.

Figure 35:
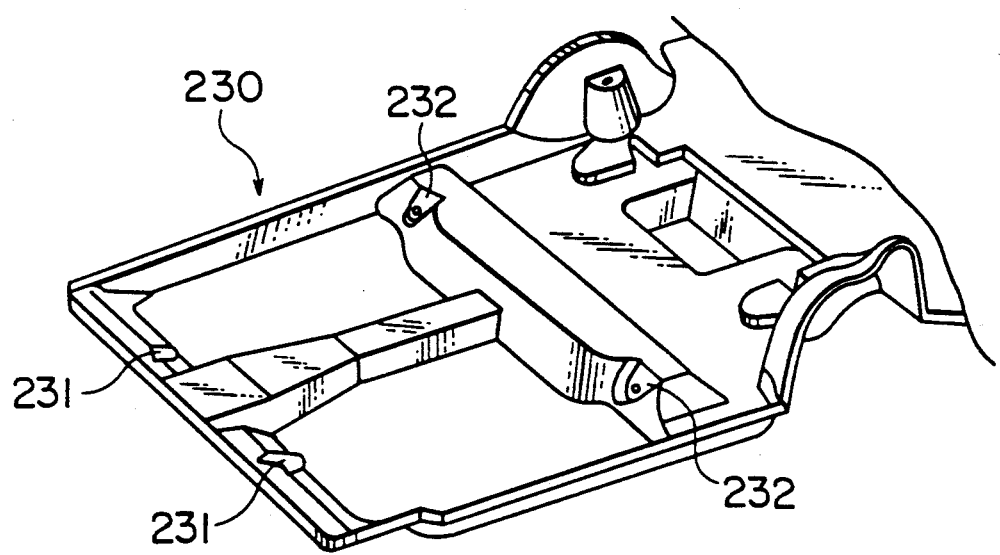
FIG. 35 is a partial perspective view showing the positions of part-mounting portion according to the eighth embodiment of the present invention.
Figure 36:
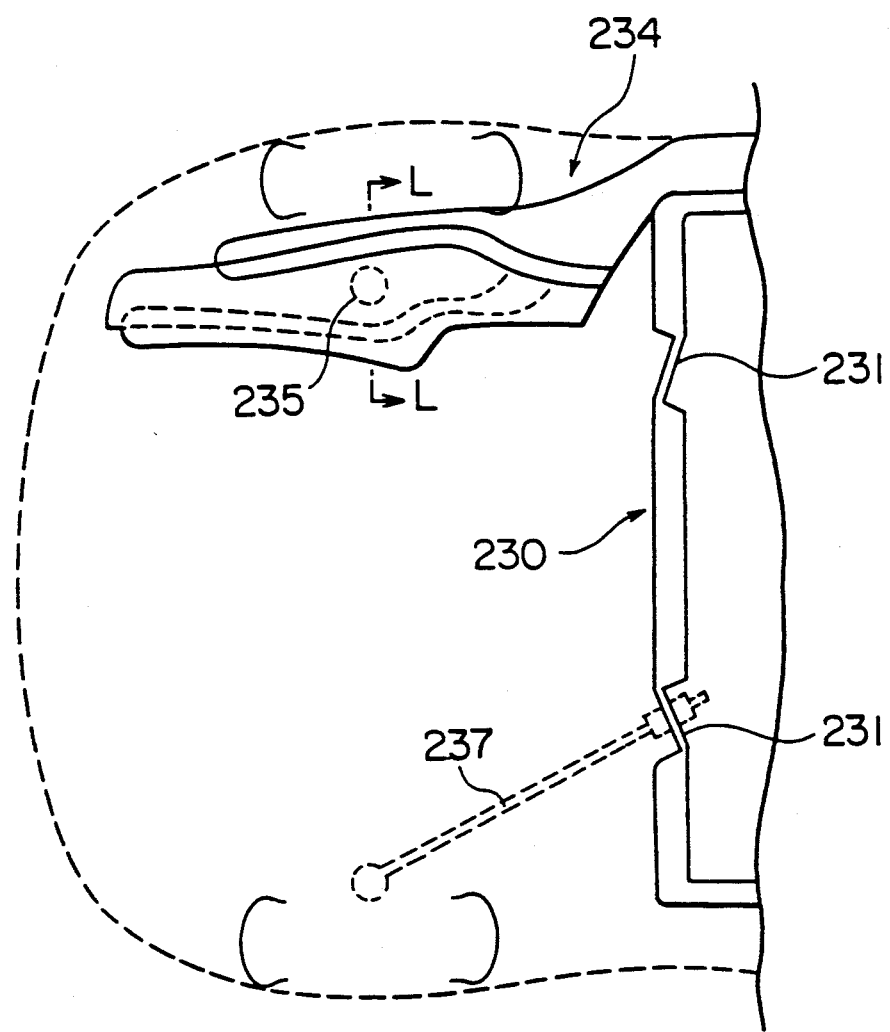
FIG. 36 is a partial schematic plan view showing another example of the part-mounting portions.

FIG. 35 is a partial perspective view showing a floor panel having part-mounting portions according to the eighth embodiment of the present invention, and FIG. 36 is a partial schematic plan view showing another example of a part-mounting portion.

In FIG. 35, the floor panel 230 having a sandwich structure is integrally formed with part-mounting portions 231, 231, 232, 232 having the shape shown in FIG. 33 whereby 231, 231 denote front radius rod-mounting portions, and 232, 232 denote rear radius rod-mounting portions.

FIG. 36 is a schematic plan view showing the front portion of the vehicle, specifically showing a front damper-mounting portion 235 of the front frame 234 (only front frame on the right side is shown). FIG. 36 also schematically shows the mounting of a front radius rod (only the left side is shown) to the floor panel 230.

Figure 37:
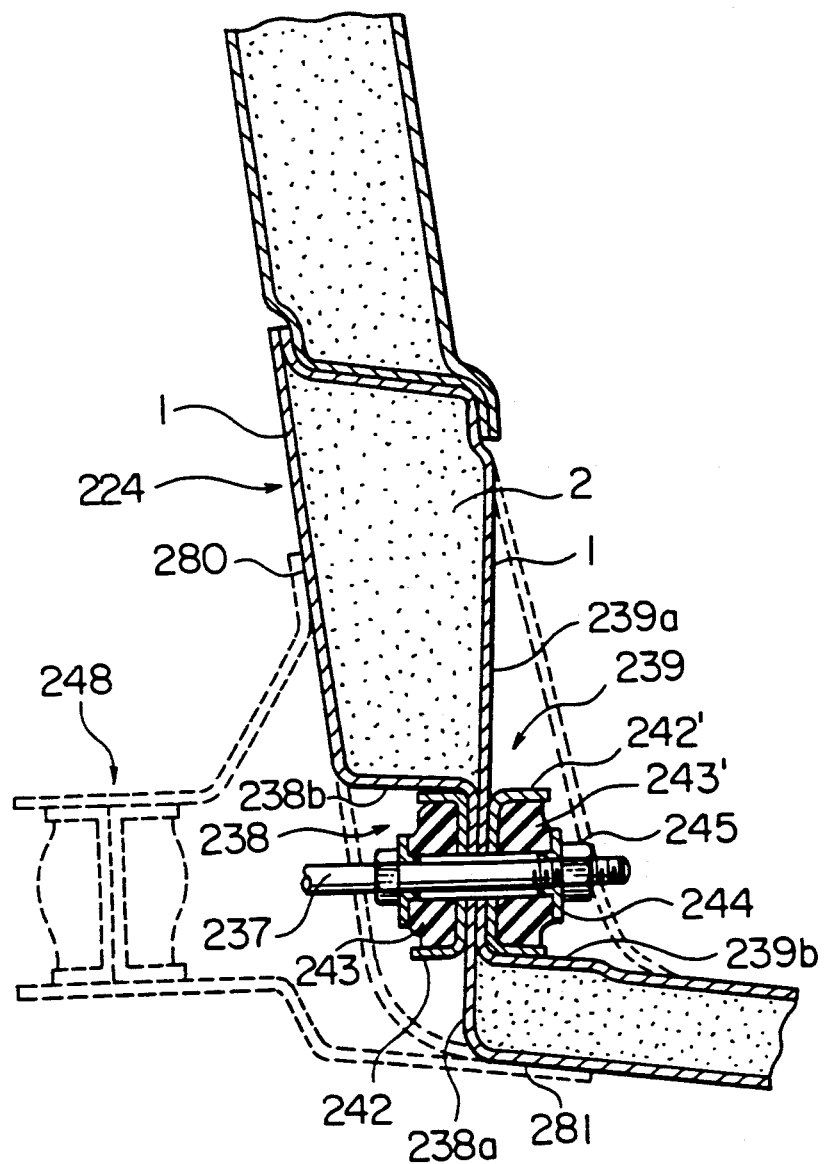
FIG. 37 is a cross-sectional view showing the mounting structure of a front radius rod.

FIG. 37 is a cross-sectional view showing the mounting structure of the front radius rod 237 to the front radius rod-mounting portion 231. The front radius rod-mounting portion 231 is provided with recesses 238 and 239 on both sides of the sandwich structure, and the bottom walls 238a and 239a of both recesses are partially bonded together. The side wall 238b of the recess 238 is formed at an upper periphery of the bottom wall-bonded area, while the side wall 239b of the recess 239 is formed at a lower periphery of the bottom wall-bonded area.

The recesses 238 and 239 are fixedly provided with metal members 242, 242' such that they are in close contact with the bottom walls and the side walls of both recesses. The end portion of the front radius rod 237 extends through a hole provided in bonded portions of the metal members 242, 242' and the skin layers 1, 1. The metal members 242, 242' are filled with elastic blocks 243, 243' made of rubber, etc. around the front radius rod 237. The radius rod 237 is fixed to the part-mounting portion by a bolt 245 via a washer 244.

Because of this mounting structure, even if a load of any direction is applied to the front radius rod, it can be sustained by the side walls and/or the bottom walls of the two recesses.

Specifically speaking, in FIG. 37, when a vertical load is applied, the load is sustained by the adhesion boundaries between the metal members 242, 242' and the bottom walls 238a, 239a, and the adhesion boundaries between the metal members 242, 242' and the side walls 238b, 239b. Also, when a lateral load is applied, it can be sustained by the above adhesion boundaries.

In addition, since both recesses are formed as shown in FIG. 3, at least one of the side walls of the recesses exists around the skin layer-bonded area 228. Accordingly, when a load is applied in a slanted direction, the load can be sustained by the side walls of the recesses in contact with the flange portions of the metal members.

Further, when a load is applied to the front radius rod 237 in an axial direction, it can be sustained by the bottom walls of the recesses and also by the adhesion between the side walls of the recesses and the metal members.

As described above, since a load of any direction exerted from the radius rod 237 is uniformly transmitted via the metal members 242, 242' to the skin layers 1, 1 of the sandwich structure, the part-mounting structure of this embodiment is extremely strong without concentration of a stress in particular portions.

Since the part-mounting portion for a front radius rod is integrally formed in the vehicle body, the part-mounting portion does not occupy a large space. For instance, a part-mounting portion 248 shown by the dotted line in FIG. 37 is mounted, this part-mounting portion 248 would occupy a considerable space. In addition, if such a part-mounting portion 248 is mounted to the vehicle body, a large stress would be applied to bonded portions 280, 281, etc. of the part-mounting portion 248 by a load applied to the front radius rod 237, leading to the peeling and breakage of these portions. Accordingly, the part-mounting structure of the present invention is advantageous not only in strength but also in space.

Figure 38:
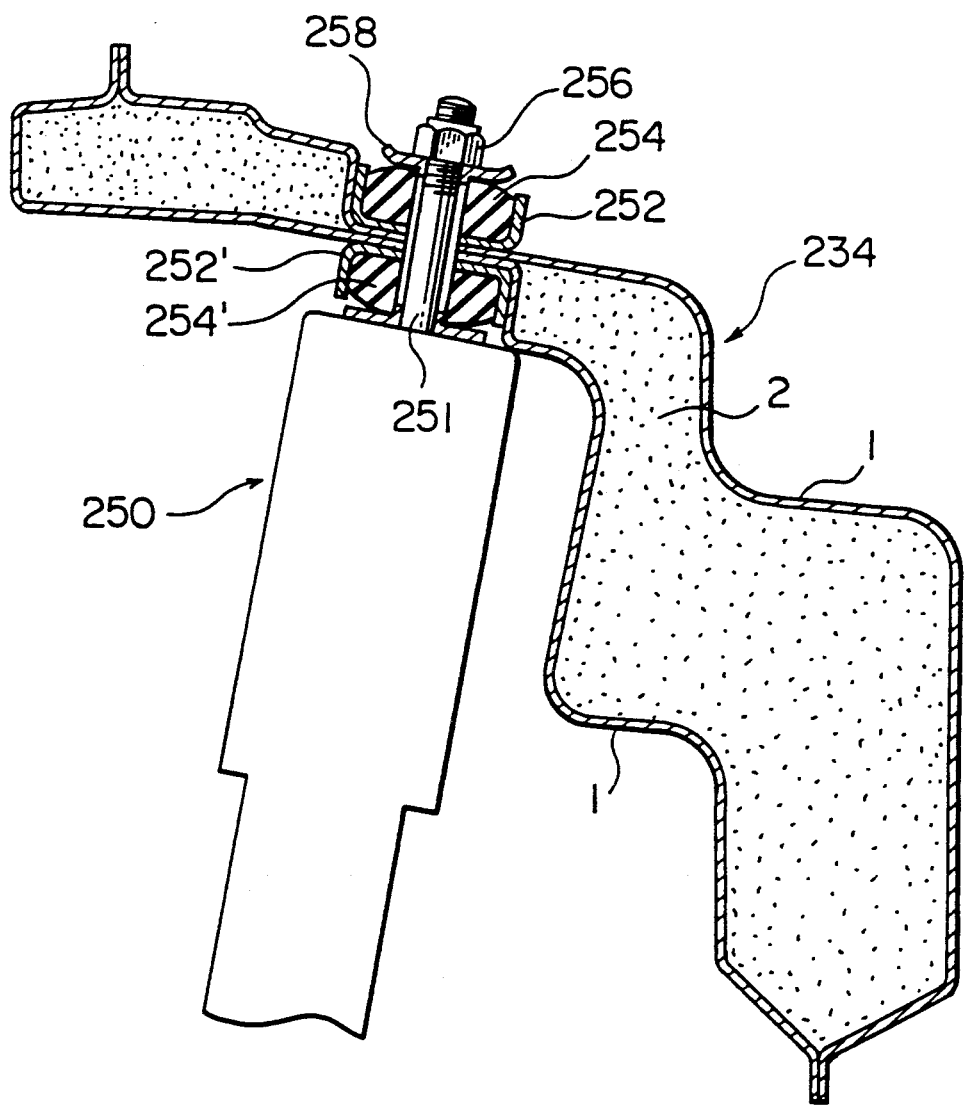
FIG. 38 is a cross-sectional view showing the mounting structure of a front damper taken along the line L—L in FIG. 36.

Incidentally, a rear radius rod can also be mounted in the same manner as the front radius rod. With respect to the front dumper, it can be mounted as shown in FIG. 38. Here, FIG. 28 is an L—L cross-sectional view of the front damper mounted to the front dumper-mounting portion 235 shown in FIG. 36. This mounting structure is basically similar to that of the front radius rod. Namely, a rod-shaped end portion 251 of the front damper 250 is fixed to the sandwich structure by inserting the rod-shaped end portion 251 into the holes of the metal members 252, 252' via rubber blocks 254, 254' and a washer 258 and fastening a bolt 256 thereto.

The part-mounting structure according to the eighth embodiment of the present invention has been explained referring to the attached drawings, but the present invention is not restricted thereto, and any modifications can be made unless they deviate from the scope of the present invention as described above. For instance, the shape of the part-mounting portion is not restricted to those shown in FIGS. 33 and 34, the side walls 225b, 226b of both recesses may be formed around the entire periphery of the skin layer-bonded area 228 to improve its rigidity. The size and shape of the recesses formed in the skin layers may be changed, depending upon their positions in the vehicle body. Parts which may be mounted to these part-mounting portions are not restricted to the above-mentioned front and rear radius rods and front dampers, and various parts such as rear dampers, and other suspensions may also be mounted.

As described above in detail, the part-mounting structure according to the eighth embodiment of the present invention enables it to mount a part to the vehicle body of a sandwich structure without using a special bracket.

In this mounting structure, the sandwich structure constituting the vehicle body is provided with recesses on both sides, and metal members are fixed to both bottom walls and side walls of these recesses to mount the part. Accordingly, a load of any direction can be sustained by the adhesion boundaries between the bottom walls and the side walls of the recesses and the metal members. Thus, this mounting structure is extremely strong.

In addition, since the part-mounting portion is integrally formed in the vehicle body, it does not occupy a large space.

Figure 39:
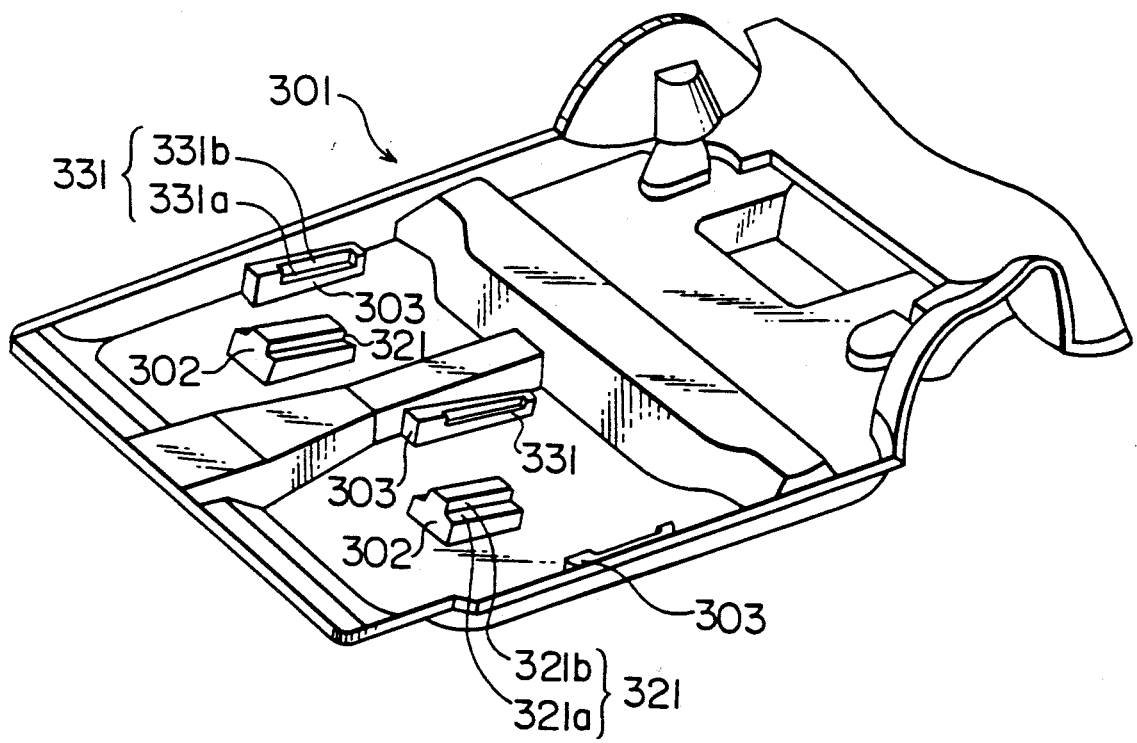
FIG. 39 is a partial perspective view showing the seat slide rail-mounting portions of a sandwich structure according to the ninth embodiment of the present invention.

FIG. 39 is a partial perspective view showing a part of a floor panel of a vehicle body having seat slide rail-mounting portions according to ninth embodiment of the present invention. The floor panel 301 is in a sandwich structure constituted by a core layer and an upper skin layer and a lower skin layer. The upper skin layer and the lower skin layer are bonded together along the entire periphery of the floor panel 301.

In FIG. 39, the left side of the floor panel is the front side of a vehicle. Ridges 302, 302 are integrally formed in the floor panel at positions just beneath a front seat. Each ridge 302 is provided on both upper lateral sides with ledges 321, 321 extending along the vehicle. The floor panel 301 is also integrally formed with ridges 303, 303 for mounting seat slide rails at positions corresponding to rear end portions of the front seat. Each ridge 303 is provided with a ledge 331 extending along the vehicle. Incidentally, the ledges 321, 331 are respectively constituted by horizontal planes 321a, 331a slightly inclined downward toward the rear direction of the vehicle and substantially vertical planes 321b, 331b.

Figure 40:
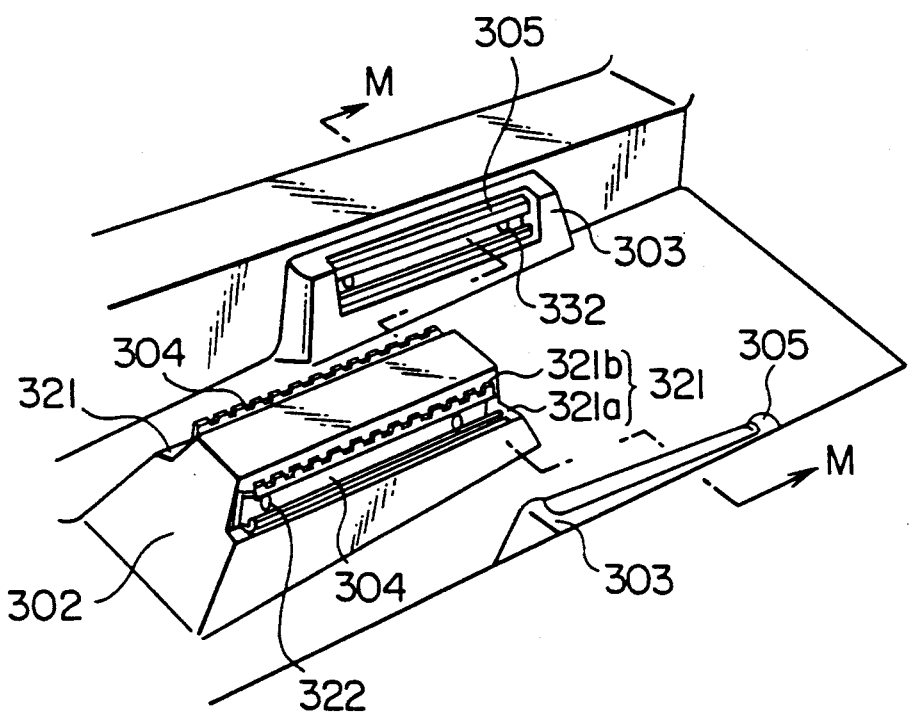
FIG. 40 is a partial perspective view showing the seat slide rails mounted to the seat slide rail-mounting portions shown in FIG. 39.
Figure 41:
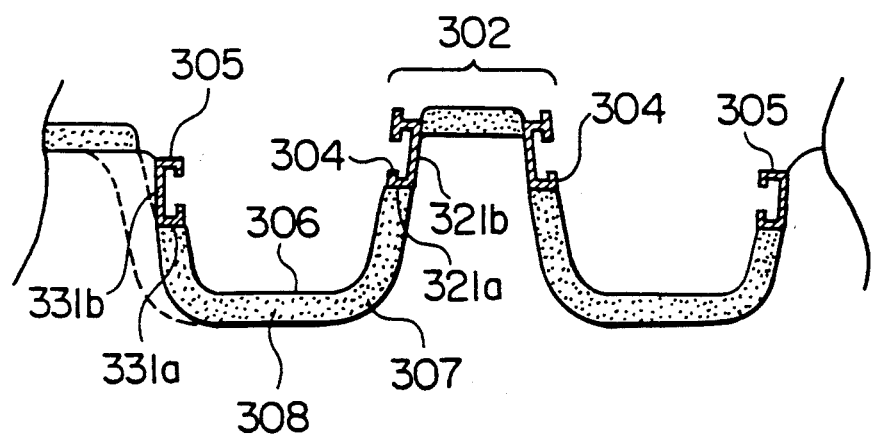
FIG. 41 is a cross-sectional view taken along the line M—M in FIG. 40.

FIG. 40 is a partially cut perspective view showing the seat slide rails fixedly mounted to the seat slide rail-mounting portions, and FIG. 41 is a cross-sectional view taken along the line M—M in FIG. 40.

The ledges 321, 321 formed on both sides of the ridge 302 are fixedly provided with first seat slide rails 304, 304 having a seat slide lock mechanism on their upper edge portions. In this embodiment, the first seat slide rail 304 is fixedly adhered to both surfaces 321a and 321b of the ledges 321. For reinforcement, the first seat slide rail 304 is fixed to the vertical ledge 321b by a plurality of bolts 322 and nuts (not shown). As is clear from FIG. 41, in the vertical wall 321b of the ledge 321, the upper skin layer 306 and the lower skin layer 307 are bonded together without a core layer 308. Accordingly, the reinforcement by the bolts 322 and the nuts is effective, thereby strengthening the adhesion between the first seat slide rail 304 and the vertical wall 321b.

On the other hand, the ledges 331, 331 formed on the ridges 303, 303 located at positions beneath rear end portions of the seat are provided with second seat slide rails 305, 305 also having cross sections shown in FIG. 41. In this embodiment, the second seat slide rail 305 is fixedly adhered to both planes 331a and 331b constituting the ledge 311. Also for reinforcement, the second seat slide rail 305 is fixed to the plane 331b by a plurality of bolts 332 and nuts (not shown). As is clear from FIG. 41, in the vertical wall 331b of the ledge 331, the upper skin layer 306 and the lower skin layer 307 are bonded together without a core layer 308. Accordingly, the reinforcement by the bolts 332 and the nuts is effective, thereby strengthening the adhesion between the second seat slide rail 305 and the vertical wall 331b.

Figure 42:
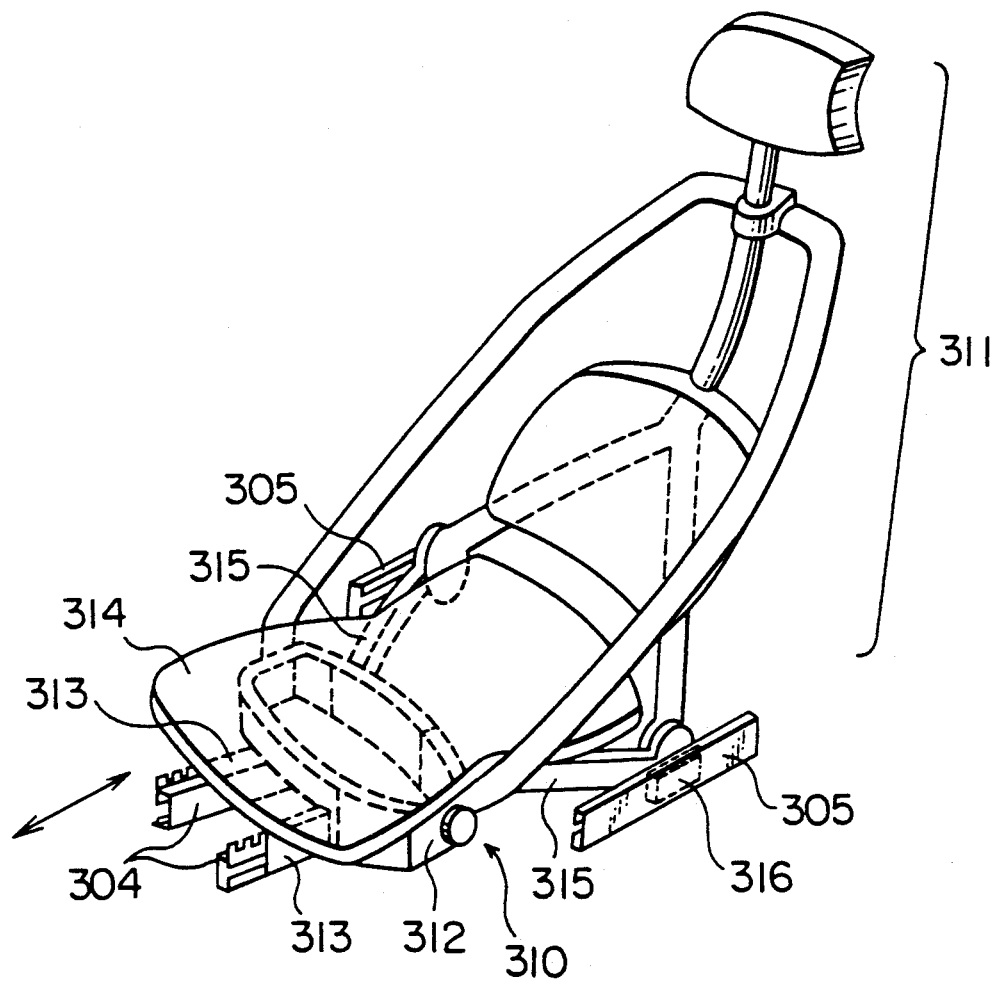
FIG. 42 is a perspective view showing one example of the seat mounted to the seat slide rail-mounting portions shown in FIG. 40, with which the seat slide rails are slidably engaged.

FIG. 42 is a perspective view showing a seat mounted to four seat slide rails 304, 304, 305, 305 fixed to the vehicle floor shown in FIG. 40 (the floor panel is omitted). The seat is constituted by a seat member 310 and a seat back 311. The seat member 310 is constituted by a seat frame 312, a seat plane 314 mounted on the seat frame 312, and a pair of first slide members 313, 313 mounted under the seat frame 312, and the seat frame 312 is integrally provided with a pair of lateral arms 315, 315 extending rearward from its rear end. Tip ends of the lateral arms 315, 315 are in engagement with second slide members 316, 316 (only left side one is shown).

The first slide members 313, 313 slidably engage the first seat slide rails 304, 304, and the second slide members 316, 316 slidably engage the second seat slide rails 305, 305. By this structure, the seat is mounted to the vehicle floor slidably back and forth. Incidentally, the fixing of the seat can be achieved by engaging latches (not shown) of the seat frame 312 with the teeth of the first seat slide rails 304, 304.

As described above, by providing the vehicle floor with the first seat slide rails and the second seat slide rails, and by mounting the seat to the seat slide rails, the seat can be mounted with enough strength. This seat slide rail-mounting structure is sufficiently strong to a load which may be applied to support the seat.

Specifically speaking, as is clear from FIG. 41, a load applied to the seat slide rails via the seat is transmitted uniformly to the skin layers to which the seat slide rails are fixed, whereby the load is sustained by the overall floor. For instance, a downward force exerted to the first seat slide rail 304 is sustained by the plane 321a of the ledge 321 and by the shear strength between the plane 321b and the first seat slide rail 304, and such a force is transmitted to the skin layer portion constituting the ledge 321 and then to a wider area of the skin layer extending below the ledge 321. In this case, a load is equally transmitted not only to the upper skin layer 306 but also to the lower skin layer 307 without any concentration of the load in particular portions. Also, a force in the axial direction of the vehicle is sustained by the shear strength of the adhesion between the first seat slide rail 304 and two planes 321a and 321b of the ledge 321. Further, a lateral force and a torsional force are sustained basically by the adhesion force between the first seat slide rail 304 and the planes 321a and 321b. Since the first seat slide rail 304 and the plane 321b are fixed by bolts 322, this seat slide rail-mounting structure is sufficiently strong to withstand the lateral force and the torsional force.

With respect to the second seat slide rail 305 fixed to the ledge 331 it can be fixed in the same manner as the first seat slide rail 304. Accordingly, the fixing of the second seat slide rail 305 is also sufficiently strong.

Figure 43:
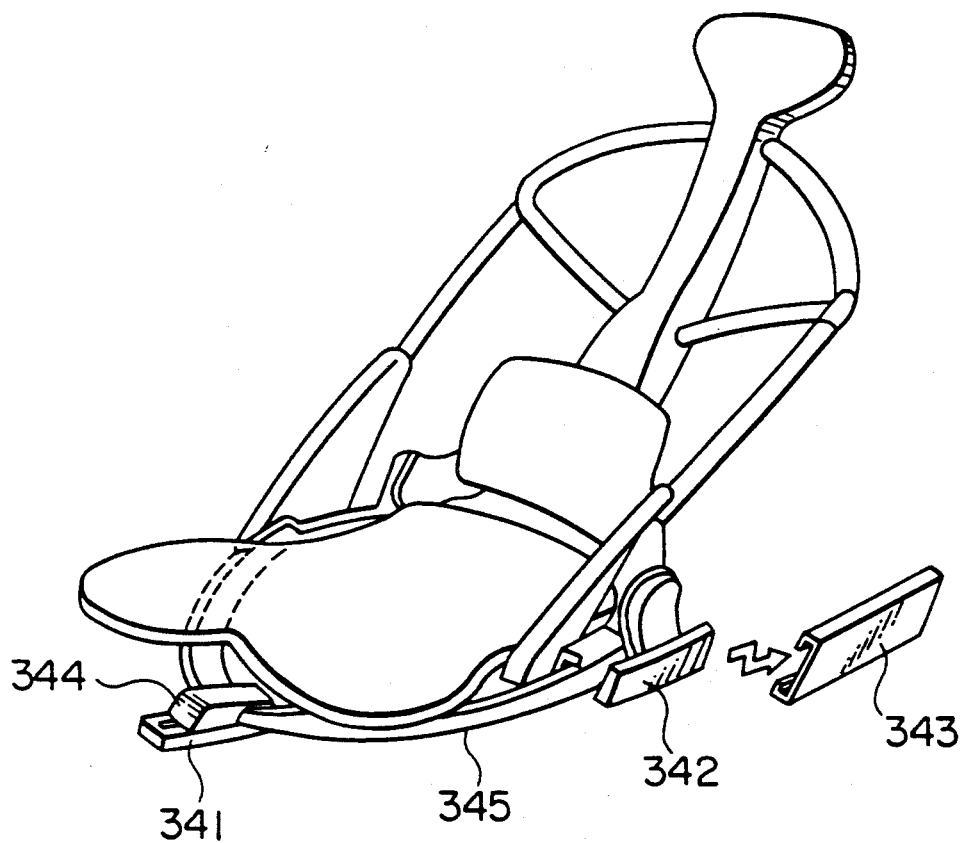
FIG. 43 is a perspective view showing another example of the seat mounted to the seat slide rail-mounting portions.
Figure 44:
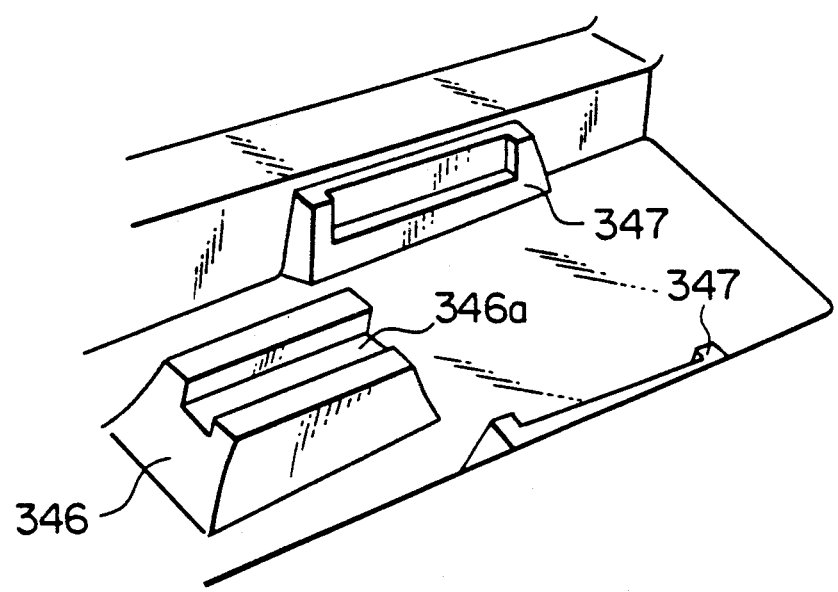
FIG. 44 is a partial perspective view showing another example of the seat slide rail-mounting portions to which the seat slide rails are fixed to slidably support the seat shown in FIG. 43.

The seat slide rail-mounting structure according to the ninth embodiment of the present invention has been explained referring to the attached drawings, but the present invention is not restricted thereto, and any modifications can be made unless they deviate from the scope of the present invention. For instance, instead of the seat shown in FIG. 42, a seat having a seat frame 345 integrally provided with a single first slide member 344 as shown in FIG. 43 can be mounted to a seat slide rail as shown in FIG. 44. In this embodiment, a ridge 346 having an axial groove 346a on its top surface is integrally formed on the vehicle floor, and the groove 346a is fixedly provided with a first seat slide rail 341. In this case, by adhering both side surfaces and a bottom surface of the first seat slide rail 341 to the groove 346a, the seat slide rail 341 can be strongly fixed strongly. Incidentally, the second slide members 342 mounted to rear end portions of the seat are slidably received in second seat slide rails 343, which are in turn fixed to ledges of the ridges 347 in the same manner as shown in FIGS. 40 and 41.

Figure 45:
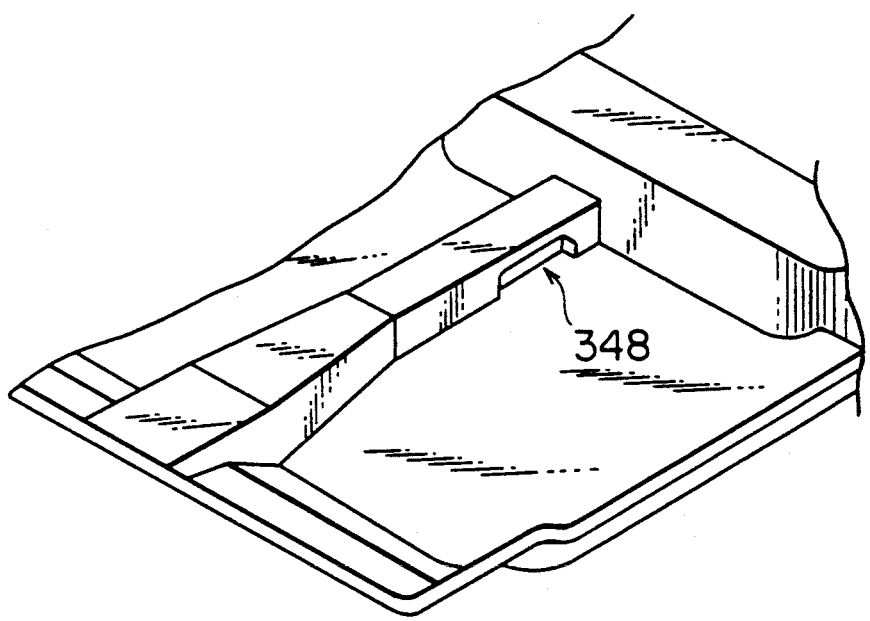
FIGS. 45(a) and (b) are partial perspective views showing a further example of the seat slide rial-mounting portions.
Figure 45:
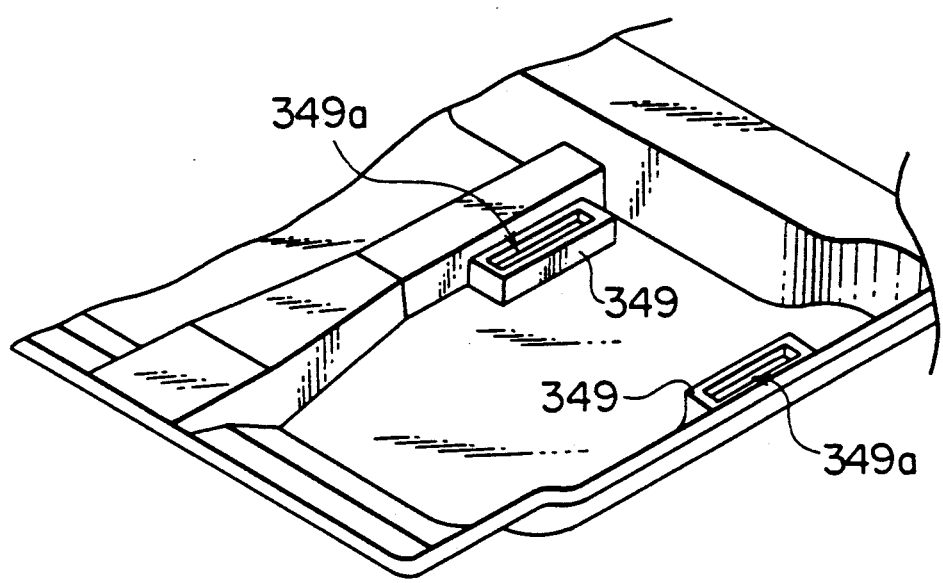

With respect to the mounting portions of the second seat slide rails mounted to the rear end portions of the seat, they may have shapes shown in FIGS. 45(a) and (b) in addition to those shown in FIGS. 39 and 44. Here, in FIG. 45(a), the vehicle floor is integrally provided with an axial recess 348, to which a second seat slide rail is mounted. Also, in FIG. 45(b), an axial ridge 349 integrally formed on the vehicle floor is provided with an axial groove 349a on its top surface, to which the second seat slide rail is mounted.

In the above embodiments, the first and second seat slide rails are slightly inclined downward from front end to rear end, so that a driver's eye point can be kept on the same height regardless of his height.

In addition, since there are there are three seat slide rails on the vehicle floor, one just beneath the seat and two under the both sides of the seat plate, free space is obtained between the second seat slide rails under the seat. Accordingly, passengers seated on the rear seat can stretch their legs.

As described above in detail, the seat slide rail-mounting structure according to the ninth embodiment of the present invention can smoothly transmit a force applied to the seat slide rails to wide areas of the skin layers constituting the vehicle floor. Accordingly, it is a very strong structure. In addition, since the seat is supported by three seat slide rails, even seat slide rails of relatively short length enable the seat to move back and forth in a sufficiently long range. Accordingly, the weight of the vehicle can be reduced, and at the same time passengers on the rear seats can enjoy a comfortable feeling ride.

Incidentally, the skin layers of the sandwich structure can be made of various plastics, and fiber-reinforced plastics are preferable. For formability, matrix materials of the fiber-reinforced plastics are preferably thermoplastic resins. Particularly, from the aspects of formability, strength and durability, carbon-reinforced nylons are preferable. The core layer may be foamed plastics, honeycomb cores or may even be hollow. However, from the aspects of formability and strength, the foamed plastics, particularly polyurethane foams are preferable.

What is claimed is:

1. A part-mounting metal member for mounting a part to a part-mounting portion of a sandwich structure constituted by a core layer and plastic skin layers formed on both surfaces of said core layer, at least one of said skin layers having a tapered recess having a sloped side wall and a flat bottom wall, said bottom wall being constituted by said skin layers bonded together, said part-mounting metal member having a bottom plate, and a pair of side plates vertically extending from said bottom plate substantially on both sides, at least one of said side plates having a dent tapered complementarily to said tapered recess of said sandwich structure.

2. The part-mounting metal member according to claim 1, wherein said part is a front suspension beam to be mounted to each front suspension beam-mounting portion of a vehicle body of a sandwich structure constituted by a core layer and plastic skin layers.

3. The part-mounting metal member according to claim 1, wherein said part is an upper arm to be mounted to each upper arm-mounting portion of a vehicle body of a sandwich structure constituted by a core layer and plastic skin layers.

4. The part-mounting metal member according to claim 1, wherein said part is an engine, and said engine-mounting metal member has a bottom plate, a pair of first side plates vertically extending from one side of said bottom plate substantially on both lateral sides, and a pair of second side plates extending from the other side of said bottom plate for supporting the engine; at least one of said first side plates having a dent tapered complementarily to said tapered recess of said sandwich structure.

5. The engine-mounting metal member according to claim 4, further comprising a pair of third side plates extending from said bottom plate on the same side as said second side plates for supporting an end of another part.

6. The part-mounting metal member according to claim 1, wherein said part is an engine to be mounted to an engine-mounting portion of a vehicle body of a sandwich structure, said metal member being constituted by (a) a first metal piece which is in a shape covering said first tapered recess and projected portion of said front skin layer on the engine side, and has a bent portion engageable with said engaging portion of said projected portion and a pair of side plate extending from both lateral sides of said first metal piece for supporting the engine, and (b) a second metal piece which is in a shape covering said second tapered recess of said rear skin layer; said first metal piece and said second metal piece being fastened by a bolt at a position where said first and second tapered direction from that of said first portion in each of said first and second portions, at least one of said skin layers having a tapered recess having a sloped side wall and a flat bottom wall, and said bottom wall being constituted by said skin layers bonded together; and (b) a metal member for mounting an engine to said engine-mounting portion, said engine-mounting metal member comprising (i) a first metal piece having a shape covering a tapered recess of said first portion formed on the engine side and a tapered recess of said second portion, and having a pair of side plates extending forward from both side edges thereof for supporting the engine; (ii) a second metal piece having a shape covering another tapered recess of said first portion on the back side; and (iii) a third metal piece having a shape covering another tapered recess of said second portion, said first metal piece being fixed to said engine-mounting portion of said sandwich structure on the engine side, said second metal piece being fixed to the tapered recess of said first portion on the back side, said third metal piece being fixed to the tapered recess of said second portion on the opposite side to said first metal piece, said second metal piece and said third metal piece being fastened to said first metal piece by bolts in said first and second portion.

7. The part-mounting metal member according to claim 1, wherein said part is an engine to be mounted to an engine-mounting portion of a vehicle body of a sandwich structure constituted by a core layer and plastic skin layers; said engine-mounting portion comprising a first portion located on the engine side, and a second portion located below said first portion and oriented in a different direction from that of said first portion, in each of said first and second portions, at least one of said skin layers having a tapered recess having a sloped side wall and a flat bottom wall, and said bottom wall being constituted by said skin layers bonded together; and said engine-mounting metal member comprising (a) a first metal piece having a shape covering a tapered recess of said first portion formed on the engine side and a tapered recess of said second portion, and having a pair of side plates extending forward from both side edges thereof for supporting the engine; (b) a second metal piece having a shape covering another tapered recess of said first portion on the back side; (c) and a third metal piece having a shape covering another tapered recess of said second portion.

8. A part-mounting structure comprising a part-mounting portion of a sandwich structure constituted by a core layer and plastic skin layers formed on both surfaces of said core layer, and a part-mounting metal member, at least one of said skin layer having a tapered recess having a sloped side wall and a flat bottom wall, said bottom wall being constituted by said skin layers bonded together, said part-mounting metal member having a bottom plate, and a pair of side plates vertically extending from said bottom plate substantially on both sides, at least one said side plates having a dent tapered complementary to said tapered recess of said sandwich structure, and said part-mounting metal member being mounted to said part-mounting portion of said sandwich structure with a surface of said tapered recess of said sandwich structure and a surface of said tapered dent of said part-mounting metal member bonded together by an adhesive.

9. The part-mounting structure according to claim 8, wherein said part-mounting metal member is further fixed to said part-mounting portion of said sandwich structure by a plurality of bolts extending through holes of said part-mounting portion and said part-mounting metal member.

10. The part-mounting structure according to claim 8, wherein said part is a front suspension beam, and said front suspension beam-mounting portions are formed in a lower edge portion of a front frame of said sandwich structure at front and rear positions (two positions), and in each front suspension beam-mounting portion, at least one of said skin layers having a tapered recess having a sloped side wall and a flat bottom wall, said bottom wall being constituted by said skin layers bonded together, and said tapered recess opening toward the edge of said sandwich structure.

11. The front suspension beam-mounting portions according to claim 10, wherein a rear mounting portion is located at a higher position than a front mounting portion, in said front mounting portion said tapered recess opening downward, and in said rear mounting portion said tapered recess opening toward the downwardly inclined forward direction.

12. The part-mounting structure according to claim 8, wherein said part is a front suspension beam, and said front suspension beam-mounting structure comprises (a) a pair of front suspension beam-mounting portions of a vehicle body of a sandwich structure constituted by a core layer and plastic skin layers, said front suspended beam-mounting portions being formed in a lower edge portion of a front and rear positions (two positions), and in each front suspension beam-mounting portion, at least one of said skin layers having a tapered recess having a sloped side wall and a flat bottom wall, said bottom wall being constituted by said skin layers bonded together, said tapered recess opening toward the edge of said sandwich structure, and (b) a pair of front suspension beam-mounting metal members each having a bottom plate and a pair of side plates vertically extending from said bottom plate substantially on both sides, at least one of said side plates having a dent tapered complementarily to said tapered recess of said sandwich structure, each of said front suspension beam-mounting metal members being mounted to each of said front suspension beam-mounting portions of said sandwich structure with a surface of said tapered recess of said sandwich structure and a surface of said tapered dent of said front suspension beam-mounting metal member bonded together by an adhesive.

13. The front suspension beam-mounting structure according to claim 12, wherein said front suspension beam is fixed to the bottom plate of said front suspension beam-mounting metal member by bolts in such a manner that an axis of said front suspension beam is substantially perpendicular to the bottom plate of said front suspension beam-mounting metal member mounted to the rear mounting portion of said sandwich structure.

14. The part-mounting structure according to claim 8, wherein said part is an upper arm, and said upper arm-mounting portions are formed in a lower edge portion of a vehicle frame of said sandwich structure at front and rear positions (two positions); in each upper arm-mounting portion, at least one of said skin layers being provided with a tapered recess having a sloped side wall and a flat bottom wall; said bottom wall being constituted by said skin layers bonded together; and said tapered recess opening toward the edge of said sandwich structure.

15. The part-mounting structure according to claim 8, wherein said part is an upper arm, and said upper arm-mounting structure comprises (a) a pair of upper arm-mounting portions of a vehicle body of a sandwich structure constituted by a core layer and plastic skin layers, said upper arm-mounting portions being formed in a lower edge portion of a vehicle frame of said sandwich structure at front and rear positions (two positions), in each upper arm-mounting portion, at least one of said skin layers having a tapered recess being provided with a sloped side wall and a flat bottom wall, said bottom wall being constituted by said skin layers bonded together, and said tapered recess opening toward the edge of said sandwich structure; and (b) a pair of upper arm-mounting metal members each having a bottom plate, a pair of first side plates vertically extending from one side of said bottom plate substantially on both lateral sides, and a pair of second side plates extending from the other side of said bottom plate for supporting the upper arm, at least one of said first side plates having a dent tapered complementary to said tapered recess of said sandwich structure; each of said upper arm-mounting metal members being mounted to each of said upper arm-mounting portions of said sandwich structure with surfaces of said tapered recesses of said sandwich structure and surfaces of said tapered dents of said first side plates of said upper arm-mounting metal members bonded together by an adhesive.

16. The upper arm-mounting structure according to claim 15, wherein said metal members are further fixed to said upper arm-mounting portions by mechanical fastening means in portions where said tapered dents of said metal members are bonded to said tapered recesses of said upper arm-mounting portions.

17. The part-mounting portion of a vehicle body according to claim 8, wherein said part is an engine.

18. The part-mounting structure according to claim 8, wherein part is an engine, and said engine-mounting structure comprises (a) an engine-mounting portion of a vehicle body of a sandwich structure constituted by a core layer and plastic skin layers formed on both surfaces of said core layer, at least one of said skin layers having a tapered recess having a sloped side wall and a flat bottom wall, and said bottom wall being constituted by said skin layers bonded together; and (b) a metal member for mounting an engine to said engine-mounting portion, said engine-mounting metal member having a bottom plate, a pair of first side plates vertically extending from one side of said bottom plate substantially on both lateral sides, and a pair of second side plates extending from the other side of said bottom plate for supporting the engine; at least one of said first side plates having a dent tapered complementarily to said tapered recess of said sandwich structure.

19. The engine-mounting structure according to claim 18, wherein said metal member is further fixed to said engine-mounting portion by mechanical fastening means in a portion where said tapered dent of said metal member is bonded to said tapered recess of said engine-mounting portion.

20. The part-mounting portion of a vehicle body according to claim 8, wherein said part is an engine, and in said engine-mounting portion, a front skin layer on the engine side being formed with a first tapered recess having a sloped side wall and a flat bottom wall, and a projected portion located below said first tapered recess and having an engaging portion at its lower end, and a rear skin layer on the back side being provided with a second tapered recess at a position corresponding to said first tapered recess, so that the bottom walls of said first tapered recess and said second tapered recess are bonded together.

21. The part-mounting structure according to claim 8, wherein said part is an engine, and the engine-mounting structure comprises (a) an engine-mounting portion of a vehicle body of a sandwich structure constituted by a core layer and plastic skin layers formed on both surfaces of said core layer, a front skin layer on the engine side being formed with a first tapered recess having a sloped side wall and a flat bottom wall, and a projected portion located below said first tapered recess and having an engaging portion at its lower end, and a rear skin layer on the back side being provided with a second tapered recess at a position corresponding to said first tapered recess, so that the bottom walls of said first tapered recess and said second tapered recess are bonded together, and (b) an engine-mounting metal member constituted by (i) a first metal piece which is in a shape covering said first tapered recess and said projection portion of said front skin layer on the engine side, and has a bent portion engageable with said engaging portion of said projected portion and a pair of side plates extending from both lateral sides of said first metal piece for supporting the engine, and (ii) a second metal piece which is in a shape covering said second tapered recess of said rear skin layer; said first metal piece and said second metal piece being fastened by a bolt at a position where said first and second tapered recesses are bonded together.

22. The part-mounting portion of a vehicle body according to claim 8, wherein said part is an engine, and the engine-mounting portion comprises a first portion located on the engine side, and a second portion located below said first portion and oriented in a different direction from that of said first portion, in each of said first and second portions, at least one of said skin layers having a tapered recess having a sloped side wall and a flat bottom wall, and said bottom wall being constituted by said skin layers bonded together.

23. The part-mounting structure according to claim 8, wherein it comprises (a) a part-mounting portion of a vehicle body of a sandwich structure constituted by a core layer and plastic skin layers formed on both structures of said core layer, one of said skin layers being provided with a recess having a side wall and a flat bottom wall, and the other skin layer being flat, said bottom wall being directly bonded to said flat skin layer to provide a flat bonded portion, and said flat bonded portion being provided with a hole for a bolt; and (b) a metal member having a shape of covering said tapered recess and having a hole for mounting the part at a position corresponding to said hole in said tapered recess; the part being mounted to said part-mounting portion of said sandwich structure via said metal member by a bolt.

24. The part-mounting structure according to claim 8, wherein said part is an engine, and the engine-mounting structure comprises (a) an engine-mounting portion of a vehicle body of a sandwich structure constituted by a core layer and plastic skin layers formed on both surfaces of said core layer, said engine-mounting portion comprising a first portion located on the engine side, and a second portion located below said first portion and oriented in a different direction from that of said first portion, in each of said first and second portions, at least one of said skin layers having a tapered recess having a sloped side wall and a flat bottom wall, and said bottom wall being constituted by said skin layers bonded together; and (b) and a metal member for mounting an engine to said engine-mounting portion, said engine-mounting metal member comprising (i) a first metal piece having a shape covering a tapered recess of said first portion formed on the engine side and a tapered recess of said second portion, and having a pair of side plates extending forward from both side edges thereof for supporting the engine; (ii) a second metal piece having a shape covering another tapered recess of said first portion on the back side; and (iii) a third metal piece having a shape covering another tapered recess of said second portion, said first metal piece being fixed to said engine-mounting portion of said sandwich structure on the engine side, said second metal piece being fixed to the tapered recess of said first portion on the back side, said third metal piece being fixed to the tapered recess of said second portion on the opposite side to said first metal piece; said second metal piece and said third metal piece being fastened to said first metal piece by bolts in said first and second portion.

25. The part-mounting portion of a vehicle body according to claim 8, wherein a recess formed in each of said skin layers has a side wall and a flat bottom wall, and said bottom wall having a hole for mounting the part in an area in which said skin layers are directly bonded together.

26. The part-mounting portion according to claim 25, wherein said side wall of each recess extends substantially vertically from the periphery of said area of said bottom wall, and side walls on both sides of the sandwich structure being located substantially symmetrically with respect to the hole in said area of said bottom wall.

27. The part-mounting structure according to claim 8, wherein it comprises (a) a part-mounting portion of a sandwich structure constituted by a core layer and plastic skin layers formed on both surfaces of said core layer, each of said skin layers being provided with a recess having a side wall and a flat bottom wall, and said bottom wall having a hole for mounting the part in an area in which said skin layers area directly bonded together; and (b) a pair of part-mounting metal members each having a shaped capable of being in close contact with said bottom wall and at least part of said side wall, and having a hole for mounting the part at a position corresponding to said hole in said area of said bottom wall; said part-mounting metal members being mounted to said part-mounting portion of said sandwich structure with an elastic block filled in each metal member in such a manner that said elastic block encloses a rod-shaped end of the part, which is threaded to a nut via a washer.

28. A seat slide rail-mounting structure for a vehicle floor of a sandwich structure constituted by a core layer and a pair of plastic skin layers, said vehicle floor being integrally formed with axial recesses or axial ledges, to which said seat slide rails are fixedly mounted.

29. The seat slide rail-mounting structure for a vehicle floor according to claim 28, wherein said ledges or said recesses are formed in said vehicle floor at three positions, one beneath a seat frame and two beneath rear ends of arms extending rearwardly from said seat frame, said three ledges or recesses being provided with said seat slide rails fixed thereto.

* * * * *